United States Patent
Motomiya et al.

(10) Patent No.: US 12,321,470 B2
(45) Date of Patent: Jun. 3, 2025

(54) DATA MANAGEMENT SYSTEM, DATA MANAGEMENT METHOD, AND NON-TRANSITORY COMPUTER READABLE MEDIUM

(71) Applicant: Hitachi, Ltd., Tokyo (JP)

(72) Inventors: Yukie Motomiya, Tokyo (JP); Takayuki Habuchi, Tokyo (JP); Kenta Takahashi, Tokyo (JP); Ken Naganuma, Tokyo (JP); Non Kawana, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 332 days.

(21) Appl. No.: 17/832,103

(22) Filed: Jun. 3, 2022

(65) Prior Publication Data

US 2022/0391518 A1    Dec. 8, 2022

(30) Foreign Application Priority Data

Jun. 7, 2021 (JP) .................................. 2021-095370

(51) Int. Cl.
G06F 21/62 (2013.01)
H04L 9/08 (2006.01)
H04L 9/30 (2006.01)

(52) U.S. Cl.
CPC ............ G06F 21/62 (2013.01); H04L 9/0866 (2013.01); H04L 9/30 (2013.01)

(58) Field of Classification Search
CPC ...... G06F 21/62; G06F 21/6209; G06F 21/32; G06F 21/46; H04L 9/0866; H04L 9/30; H04L 63/0428; H04L 63/0861
See application file for complete search history.

(56) References Cited

U.S. PATENT DOCUMENTS

2009/0183008 A1    7/2009   Jobmann
2012/0066507 A1    3/2012   Jobmann
(Continued)

FOREIGN PATENT DOCUMENTS

CN    108475307 A    8/2018
JP    2007-310639 A    11/2007
(Continued)

OTHER PUBLICATIONS

Extended European Search report issued in corresponding EP Application No. 22176262.8, dated Oct. 24, 2022 (9 pages).
(Continued)

*Primary Examiner* — Shin-Hon (Eric) Chen
*Assistant Examiner* — Vladimir I Gavrilenko
(74) *Attorney, Agent, or Firm* — Foley & Lardner LLP

(57) ABSTRACT

A first computer, in data registration processing: determines a type of biometric information for encryption with which the data is to be encrypted; acquires the determined type of biometric information for encryption from a user of the first computer; generates, from each piece of the acquired biometric information for encryption, a public key based on a predetermined algorithm; transmits the public key to a second computer; and transmits the data encrypted with the public key to the third computer, the first computer, in data presentation processing: acquires the encrypted data from a third computer; acquires the determined type of biometric information for decryption from the user of the first computer; generates, from each piece of the acquired biometric information for decryption, a private key based on the predetermined algorithm; decrypts the encrypted data with use of the private key; and presents each piece of the decrypted registered data.

14 Claims, 12 Drawing Sheets

(56) References Cited

U.S. PATENT DOCUMENTS

| | | | |
|---|---|---|---|
| 2016/0337131 A1 | 11/2016 | De Andrada et al. | |
| 2016/0381003 A1 | 12/2016 | Caceres et al. | |
| 2017/0041296 A1* | 2/2017 | Ford | G06F 21/64 |
| 2017/0141920 A1 | 5/2017 | Herder et al. | |
| 2017/0300678 A1* | 10/2017 | Metke | H04W 12/068 |
| 2019/0356491 A1 | 11/2019 | Herder et al. | |
| 2020/0193420 A1* | 6/2020 | Vogel | G06Q 20/3829 |
| 2021/0125185 A1* | 4/2021 | Indermaur | G06Q 20/40145 |
| 2023/0215524 A1* | 7/2023 | Koide | H04L 9/50 705/3 |

FOREIGN PATENT DOCUMENTS

| | | |
|---|---|---|
| JP | 2016-053693 A | 4/2016 |
| JP | 2020-191048 A | 11/2020 |
| JP | 2021-005870 A | 1/2021 |

OTHER PUBLICATIONS

"Three, Centralized Identity Authentication Services", "Digitalized campus ideas, design and implementation", Fertiliser: Chinese Science and Technology University Press, Jan. 2014 with partial Machine translation (6 pages).

"Wireless Access Infrastructure, Giardia Army Ed.," Network Security Technology and Applications, Beijing: Machine Industry Press, Feb. 2009 with partial Machine translation (9 pages).

Chinese Office Action issued in corresponding CN Application No. 202210511729.X, dated Sep. 13, 2024 with Machine translation (18 pages).

Japanese Office Action issued in corresponding JP Application No. 2021-095370, dated Oct. 22, 2024 with Machine translation (8 pages).

Shibata et al., Partial translation of "Mechanism-based PKI—A Real-time Key Generation from Fingerprints", Chapters 3.2 and 3.3, Aug. 2004, 18 pages.

Chinese Office Action issued in corresponding CN Application No. 202210511729.X, dated Jul. 6, 2024 with English translation (18 pages).

* cited by examiner

~ 221

OF THE FOLLOWING ITEMS, WHICH ONES REFLECT YOUR PREFERENCES?
CHECK ALL BOXES THAT APPLY TO YOU.

☐ PREFER THE REQUIRED TIME TO BE SHORT (PREFER QUICKNESS)

☐ PREFER NON-TAXING*1 ACTION (OPERATION)
 *1) NO PHYSICAL STRESS, NO NEED TO MEMORIZE, TAKE NO TIME TO BECOME ACCUSTOMED TO, ETC.

☐ PREFER NATURAL ACTION (OPERATION)

☐ PREFER ACTION (OPERATION) INTEGRATED INTO A SINGLE ACTION

☐ PREFER PERFORMING ONE ACTION (OPERATION) AT A TIME IN ORDER
  ⇔ PREFER PERFORMING EVERY ACTION (OPERATION) AT ONCE

☐ PREFER A TYPE THAT IS SAFE (FOOLPROOF, HARD TO FAKE/MIMIC)

☐ PREFER MAKING A DECISION AFTER LOOKING OVER ALL OPTIONS
  ⇔ PREFER DECIDING AS SOON AS COMING ACROSS A DESIRABLE OPTION, WITHOUT LOOKING AT THE REST

☐ CANNOT OR DO NOT WISH TO USE SOME METHODS FOR PERSONAL REASONS*2
 *2) REASONS RELATED TO RELIGION, DISABILITY, INJURIES AND ILLNESSES, OCCUPATION, RACE, AND THE LIKE

FIG. 9

DATA MANAGEMENT SYSTEM, DATA MANAGEMENT METHOD, AND NON-TRANSITORY COMPUTER READABLE MEDIUM

CLAIM OF PRIORITY

The present application claims priority from Japanese patent application JP 2021-095370 filed on Jun. 7, 2021, the content of which is hereby incorporated by reference into this application.

BACKGROUND OF THE INVENTION

The present invention relates to a data management system, a data management method, and a non-transitory computer-readable medium.

JP 2021-5870 A can be given as the background art of this invention. JP 2021-5870 A includes a description of a usage permit issuing apparatus. According to the description, "A usage permit issuing apparatus 1 stores, for each user, authentication data and an authentication method in association with one or more pieces of identification information of the user. When a usage permit issuance request is received from a setting terminal 5, the user permit issuing apparatus 1 issues a usage permit and generates a signature, and also identifies authentication data associated with user's identification information and an authentication method that are included in this issuance request to notify setting information including the usage permit, the signature, and the authentication data to the setting terminal 5. The setting terminal 5 registers the setting information in a usage permit notification apparatus 4. The usage permit notification apparatus 4 acquires authentication data from the user, and transmits the usage permit and the signature of the setting information including the acquired authentication data to a usage control apparatus 3. The usage control apparatus 3 verifies the signature and, when the signature is successfully verified and a usage condition included in the usage permit is satisfied, lifts a usage restriction on a usage target." (See Abstract.)

In JP 2021-5870 A, the usage permit notification apparatus is described to be capable of using a biometric authentication method, but no specific description is found on how biometric information is stored, and there is a fear of invasion of privacy and unauthorized use of biometric information as a result of leakage of the biometric information. The technology as described in JP 2021-5870 A also has a fear of fraudulent use of a lost or stolen usage permit in the form of impersonation of a person to which the permit has been issued. Therefore, at least one aspect of the present invention deals with safely managing data without using utilization data or a device carried by an individual for private key management.

SUMMARY OF THE INVENTION

In order to solve the above problem, the at least one aspect of the present invention adopts the following structures. A data management system, comprises: a first computer; a second computer; and a third computer, the first computer being configured to, in data registration processing: hold data; determine a type of biometric information for encryption with which the data is to be encrypted; acquire the determined type of biometric information for encryption from a user of the first computer; generate, from each piece of the acquired biometric information for encryption, a public key based on a predetermined algorithm; encrypt the data with use of the public key; transmit the public key to the second computer; and transmit the encrypted data to the third computer, the first computer being configured to, in data presentation processing: acquire the encrypted data from the third computer; acquire the determined type of biometric information for decryption from the user of the first computer; generate, from each piece of the acquired biometric information for decryption, a private key based on the predetermined algorithm; decrypt the encrypted data with use of the private key; and present each piece of the decrypted registered data.

The at least one aspect of the present invention can deal with safely managing data without using utilization data or a device carried by an individual for private key management.

Problems, configurations, and effects which are not mentioned above are explained in the following embodiments.

BRIEF DESCRIPTIONS OF DRAWINGS

The present invention can be appreciated by the description which follows in conjunction with the following figures, wherein:

FIG. 9 is an example of a characteristics check sheet according to the first embodiment;

DETAILED DESCRIPTION OF THE PREFERRED EMBODIMENTS

Figure 1:
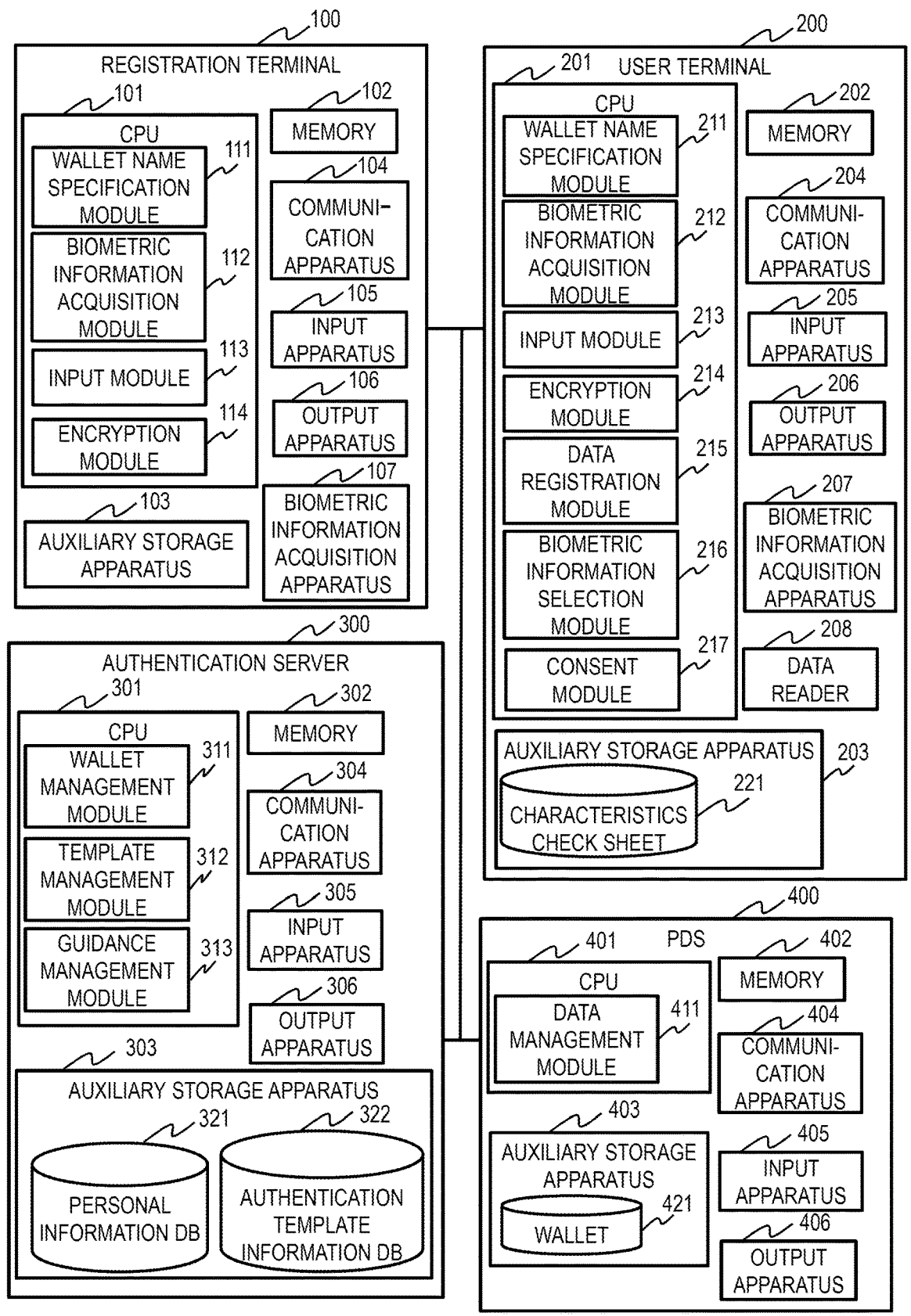
FIG. 1 is a block diagram for illustrating a configuration example of a data management system according to the first embodiment.

In the following, an embodiment of the present invention is explained referring the attached drawings. The embodiment is an example to achieve the present invention and does not limit a technical range of the present invention. In the drawings, the same configuration has the same reference letter.

First Embodiment

FIG. 1 is a block diagram for illustrating a configuration example of a data management system. The data management system includes, for example, a registration terminal 100, a user terminal 200, an authentication server 300, and a personal data store (PDS) 400, which are coupled to one another by the Internet or a similar network. In the example of FIG. 1, one registration terminal 100, one user terminal 200, and one PDS 400 are illustrated. However, the data management system may include more than one registration terminal 100, more than one user terminal 200, and more than one PDS 400.

The registration terminal 100 is configured from a computer including, for example, a central processing unit (CPU) 101, a memory 102, an auxiliary storage apparatus 103, a communication apparatus 104, an input apparatus 105, an output apparatus 106, and a biometric information acquisition apparatus 107.

The CPU 101 includes a processor, and executes a program stored in the memory 102. The memory 102 includes a read only memory (ROM), which is a nonvolatile memory device, and a random access memory (RAM), which is a volatile memory device. The ROM stores, for example, an invariant program (for example, basic input/output system (BIOS)). The RAM is a dynamic random access memory (DRAM) or other such high-speed and volatile memory device, and temporarily stores a program to be executed by the CPU 101 and data to be used at a time of execution of the program.

The auxiliary storage apparatus 103 is, for example, a large-capacity and non-volatile storage apparatus such as a magnetic storage apparatus (hard disk drive (HDD)) and a flash memory (solid state drive (SSD)). Programs and data to be used when the programs are executed by the CPU 101 are stored in the auxiliary storage apparatus 103. Specifically, the programs are read from the auxiliary storage apparatus 103, loaded onto the memory 102, and executed by the CPU 101.

The input apparatus 105 is a keyboard, a mouse, or a similar apparatus through which input from an operator is received. The output apparatus 106 is a display apparatus, a printer, or a similar apparatus from which a result of executing a program is output in a format visually recognizable to the operator.

The communication apparatus 104 is a network interface apparatus which controls communication to and from another apparatus in accordance with a predetermined protocol. The communication apparatus 104 includes, for example, a serial interface such as a universal serial bus (USB).

Some or all of programs executed by the CPU 101 may be provided to the registration terminal 100 from a removable medium (a CD-ROM, a flash memory, or the like) that is a non-transitory storage medium, or from an external computer including a non-transitory storage apparatus via a network, to be stored in the non-volatile auxiliary storage apparatus 103, which is a non-transitory storage medium. It is therefore recommended for the registration terminal 100 to include an interface which reads data from removable media. The same applies to the user terminal 200, the authentication server 300, and the PDS 400.

The biometric information acquisition apparatus 107 acquires biometric information of a user. Examples of the biometric information acquisition apparatus 107 include a camera with which an image of a user's face is photographed, and a scanner which acquires an image of a user's fingerprint or finger veins.

The registration terminal 100 is a computer system formed on physically one computer or formed on a plurality of computers that are configured logically or physically, and may be operated on separate threads on the same computer, or may operate on a virtual machine built on a plurality of physical computer resources. The same applies to the user terminal 200, the authentication server 300, and the PDS 400.

The CPU 101 includes, for example, a wallet name specification module 111, a biometric information acquisition module 112, an input module 113, and an encryption module 114. The wallet name specification module 111 specifies a name of a wallet. The biometric information acquisition module 112 acquires biometric information of a user via the biometric information acquisition apparatus 107. The input module 113 receives input from the user via the input apparatus 105. The encryption module 114 encrypts data to be registered, and decrypts encrypted registration data (data to be presented).

For example, the CPU 101 functions as the wallet name specification module 111 by operating in accordance with a wallet name specification program loaded onto the memory 102, and functions as the biometric information acquisition module 112 by operating in accordance with a biometric information acquisition program loaded onto the memory 102. The same relationship between a program and a function module applies to the other function modules included in the CPU 101. The same relationship between a program and a function module also applies to function modules included in a CPU 201 of the user terminal 200, function modules included in a CPU 301 of the authentication server 300, and function modules included in a CPU 401 of the PDS 400, which are described later.

Some or all of functions that are provided by the function modules included in the CPU 101, the CPU 201 of the user terminal 200, the CPU 301 of the authentication server 300, and the CPU 401 of the PDS 400 may be implemented by hardware, for example, an application-specific integrated circuit (ASIC) or a field-programmable gate array (FPGA).

Information stored in the auxiliary storage apparatus 103, information stored in an auxiliary storage apparatus 203 of the user terminal 200, information stored in an auxiliary storage apparatus 303 of the authentication server 300, and information stored in an auxiliary storage apparatus 403 of the PDS 400 may partially or entirely be stored in the memory 102, a memory 202, a memory 302, and a memory 402, respectively, or another database coupled to the auxiliary storage apparatus 103, another database coupled to the auxiliary storage apparatus 203, another database coupled to the auxiliary storage apparatus 303, and another database coupled to the auxiliary storage apparatus 403, respectively.

In the first embodiment, information used by the data management system is independent of data structure and may be expressed in any data structure. Although the information is expressed in a table format in the first embodiment, a data structure appropriately selected from among, for example, a list, a database, and a queue may store the information.

The user terminal 200 is configured from a computer including, for example, the CPU 201, the memory 202, the auxiliary storage apparatus 203, a communication apparatus 204, an input apparatus 205, an output apparatus 206, a biometric information acquisition apparatus 207, and a data reader 208.

Descriptions of the CPU 201, the memory 202, the auxiliary storage apparatus 203, the communication apparatus 204, the input apparatus 205, the output apparatus 206, and the biometric information acquisition apparatus 207 as hardware are the same as the descriptions of the CPU 101, the memory 102, the auxiliary storage apparatus 103, the communication apparatus 104, the input apparatus 105, the output apparatus 106, and the biometric information acquisition apparatus 107 as hardware, and are therefore omitted. The data reader 208 is an apparatus which reads data from, for example, a two-dimensional code or an IC chip.

The CPU 201 includes, for example, a wallet name specification module 211, a biometric information acquisition module 212, an input module 213, an encryption module 214, a data registration module 215, a biometric information selection module 216, and a consent module 217.

The wallet name specification module 211 specifies a name of a wallet. The biometric information acquisition module 212 acquires biometric information of a user via the biometric information acquisition apparatus 207. The input module 213 receives input from the user via the input apparatus 205. The encryption module 214 encrypts data to be registered, and decrypts encrypted registration data (data to be presented).

The data registration module 215 registers encrypted data to be registered in the PDS 400. The biometric information selection module 216 selects a type (modality) of biometric information to be used for encryption, and modality of biometric information to be used for consent. The consent module 217 generates an electronic signature expressing a consent to a purpose of use of data to be presented.

The auxiliary storage apparatus 203 holds, for example, a characteristics check sheet 221. The characteristics check sheet is a check sheet for determining a personality and characteristics of a user. The biometric information selection module 216 determines whether the type of biometric information used for the encryption function and the type of biometric information used for the consent function are to be common with the type of biometric information for authentication. When it is determined that the type of biometric information for encryption and the type of biometric information for consent are not to be common with the type of biometric information for authentication, the biometric information selection module 216 can determine the type of biometric information to be used for encryption and the type of biometric information to be used for consent from, for example, a result of determination using the characteristics check sheet 221 (there is a possibility that the type of biometric information to be used for encryption or consent ends up being common with the type of biometric information for authentication as a result of determination based on the characteristics check sheet 221). The characteristics check sheet 221 is determined in advance.

The authentication server 300 is configured from a computer including, for example, the CPU 301, the memory 302, the auxiliary storage apparatus 303, a communication apparatus 304, an input apparatus 305, and an output apparatus 306. Descriptions of the CPU 301, the memory 302, the auxiliary storage apparatus 303, the communication apparatus 304, the input apparatus 305, and the output apparatus 306 as hardware are the same as the descriptions of the CPU 101, the memory 102, the auxiliary storage apparatus 103, the communication apparatus 104, the input apparatus 105, and the output apparatus 106 as hardware, and are therefore omitted.

The CPU 201 includes, for example, a wallet management module 311, a template management module 312, and a guidance management module 313. The wallet management module 311 manages names of wallets held in the PDS 400, and specifies a wallet of the PDS 400 that is a registration destination of encrypted data. The template management module 312 manages a public key and the like that are associated with a wallet name. The guidance management module 313 displays a guidance indicating a type or types of biometric information to be acquired in decryption processing and in consent processing.

The auxiliary storage apparatus 303 holds, for example, a personal information database (DB) 321 and an authentication template information DB 322. The personal information DB 321 holds a wallet name, and a pointer indicating a PDS in which a wallet having this wallet name is held.

The authentication template information DB 322 holds a wallet name, a public key, and information indicating whether a guidance is to be displayed. The information stored in the personal information DB 321 and the information stored in the authentication template information DB 322 are generated by processing described later.

The PDS 400 is configured from a computer including, for example, the CPU 401, the memory 402, the auxiliary storage apparatus 403, a communication apparatus 404, an input apparatus 405, and an output apparatus 406. Descriptions of the CPU 401, the memory 402, the auxiliary storage apparatus 403, the communication apparatus 404, the input apparatus 405, and the output apparatus 406 as hardware are the same as the descriptions of the CPU 101, the memory 102, the auxiliary storage apparatus 103, the communication apparatus 104, the input apparatus 105, and the output apparatus 106 as hardware, and are therefore omitted.

The CPU 401 includes, for example, a data management module 411. The data management module 411 manages data to be stored in wallets 421. The auxiliary storage apparatus 403 holds, for example, one or more wallets 421. Each of the wallets 421 is a storage area provided in the auxiliary storage apparatus 403 to hold encrypted data, and associated with a wallet name.

As an example of modification, some of the apparatus included in the data management system may be integrated into one apparatus. For example, the registration terminal 100 and the user terminal 200 may be integrated, the registration terminal 100 and the PDS 400 may be integrated, and the user terminal 200 and the PDS 400 may be integrated.

Figure 2:
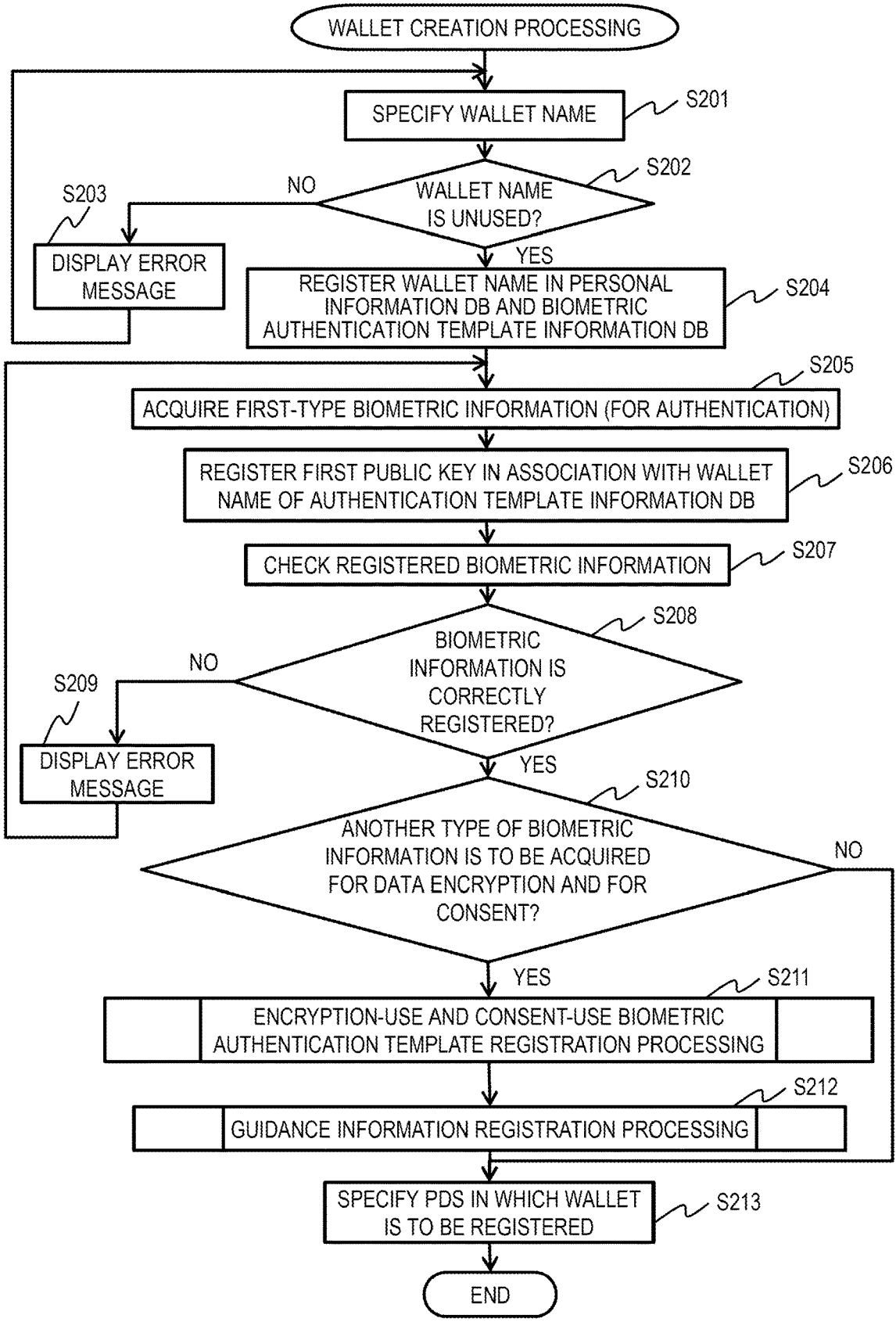
FIG. 2 is a flow chart for illustrating an example of wallet creation processing according to the first embodiment.

FIG. 2 is a flow chart for illustrating an example of wallet creation processing. The wallet name specification module 111 of the registration terminal 100 specifies a wallet name via, for example, a user's input to the input apparatus 105, and transmits the specified wallet name to the authentication server 300 (Step S201).

The wallet management module 311 of the authentication server 300 determines whether the received wallet name is unused in the personal information DB 321 (Step S202). When it is determined that the received wallet name is already used in the personal information DB 321 (Step S202: NO), the wallet management module 311 transmits an error message to the registration terminal 100 to display the error message on the output apparatus 106 of the registration terminal 100 (Step S203). When it is determined that the received wallet name is unused in the personal information DB 321 (Step S202: YES), the wallet management module 311 registers the received wallet name in the personal information DB 321 and the authentication template information DB 322 (Step S204).

The biometric information acquisition module 112 of the registration terminal 100 acquires, via the biometric information acquisition apparatus 107, first-type biometric information (for example, an image of finger veins, a fingerprint, or a face, or a gait) for authentication (for access to a wallet) of the user of the registration terminal 100 (Step S205). The type (modality) of biometric information for authentication may be specified in advance by the user of the registration terminal 100, or may be specified in advance by the authentication server 300.

The processing step of Step S205 further includes generation of a key pair pairing a first private key and a first public key, and, when required, first supplementary information (for executing error correction), by the encryption module 114, from the acquired first-type biometric information.

Specifically, the encryption module 114 generates the key pair from the biometric information in accordance with, for example, a fuzzy extractor, a fuzzy signature, the Public Biometric Infrastructure (PBI), or other algorithms. When a fuzzy extractor or a similar algorithm is used, the supplementary information is utilized in authentication processing described later. Although an example of generating a pair of a private key and a public key from biometric information is described in the first embodiment, the pair of a private key and a public key may be generated not only from biometric information and other types of information unique to an individual but also from information that can be presented by a person empty-handed, for example, a password or other types of information memorized by the person.

The encryption module 114 transmits, to the authentication server 300, the first public key (as well as the first supplementary information when generated) and information indicating from which type of biometric information the first public key has been generated. The template management module 312 of the authentication server 300 registers the received first public key (as well as the first supplementary information when generated) and the received information indicating from which type of biometric information the first public key has been generated, in the authentication template information DB 322, in association with the specified wallet name, as a first public key (as well as the first supplementary information when generated) for authentication (Step S206).

The biometric information acquisition module 112 of the registration terminal 100 displays the biometric information acquired in Step S205 on the output apparatus 106 of the registration terminal 100, and the input module 113 of the registration terminal 100 acquires a check result indicating whether the biometric information for authentication is correctly registered by, for example, the user's input to the input apparatus 105, and transmits the check result to the authentication server 300 (Step S207). Specifically, in Step S207, the user of the registration terminal 100 checks, for example, whether the user of the registration terminal 100 has accidentally curled his or her finger during scanning for acquiring a finger vein image with the biometric information acquisition apparatus 107 when the i-th-type biometric information is finger veins, or whether the user of the registration terminal 100 has accidentally looked to the side during photographing of a face image with the biometric information acquisition apparatus 107 when the i-th-type biometric information is a face.

The template management module 312 determines, from the check result, whether the biometric information for authentication is correctly registered (Step S208). When the template management module 312 determines from the received check result that the biometric information for authentication is not correctly registered (Step S208: NO), the information registered in Step S206 in the authentication template information DB 322 is deleted, and an error message is transmitted to the registration terminal 100 to be displayed on the output apparatus 106 of the registration terminal 100 (Step S209). The process then returns to Step S205.

When the template management module 312 determines from the received check result that the biometric information for authentication is correctly registered (Step S208: YES), an inquiry is issued to the registration terminal 100 about whether biometric information of another type is to be registered for data encryption and/or for consent (Step S210).

When the input module 113 of the registration terminal 100 determines by, for example, input from the user of the registration terminal 100, that biometric information of another type is to be registered for data encryption and/or for consent (Step S210: YES), encryption-use and consent-use biometric authentication template registration processing (Step S211) and guidance information registration processing (Step S212) are executed.

Details of the encryption-use and consent-use biometric authentication template registration processing and the guidance information registration processing are described later. The wallet creation processing further includes a step in which the wallet management module 311 of the authentication server 300 specifies the PDS 400 that is a registration destination of the wallet, and registers a pointer (hereinafter also referred to as "PDS pointer") pointing to the specified PDS 400 in the personal information DB 321, in association with the specified wallet name (Step S213). The wallet creation processing is then ended.

In Step S213, the wallet management module 311 may specify, for example, the PDS 400 that has the largest available capacity by issuing an inquiry to the auxiliary storage apparatus 403 about an available capacity of the PDS 400, or the next PDS 400 in a predetermined order.

The wallet management module 311 may specify more than one PDS 400 to manage encrypted data described later among the more than one PDS 400 in a distributed manner. In other words, one piece of encrypted data may be distributed among more than one PDS 400 to be stored, or a plurality of pieces of encrypted data may be stored in different PDSes out of more than one PDS 400.

When the input module 113 of the registration terminal 100 determines by, for example, input from the user of the registration terminal 100, that biometric information of another type is not to be registered for data encryption and/or for consent (Step S210: NO), the process proceeds to Step S213. Consequently, the same type of biometric information as the type of the biometric information for authentication is used as the biometric information for encryption (for decryption) and the biometric information for consent. This means that, once biometric information is acquired, the acquired biometric information is usable for all of authentication processing, decryption processing, and consent processing. Thus, the user is saved of trouble and the processing speed improves as well.

The example described with reference to FIG. 2 is an example in which one type of biometric information for authentication is used. However, a plurality of types of biometric information may be acquired for authentication, with a public key generated for each of the plurality of types of biometric information and registered in the authentication template information DB 322.

Figure 3:
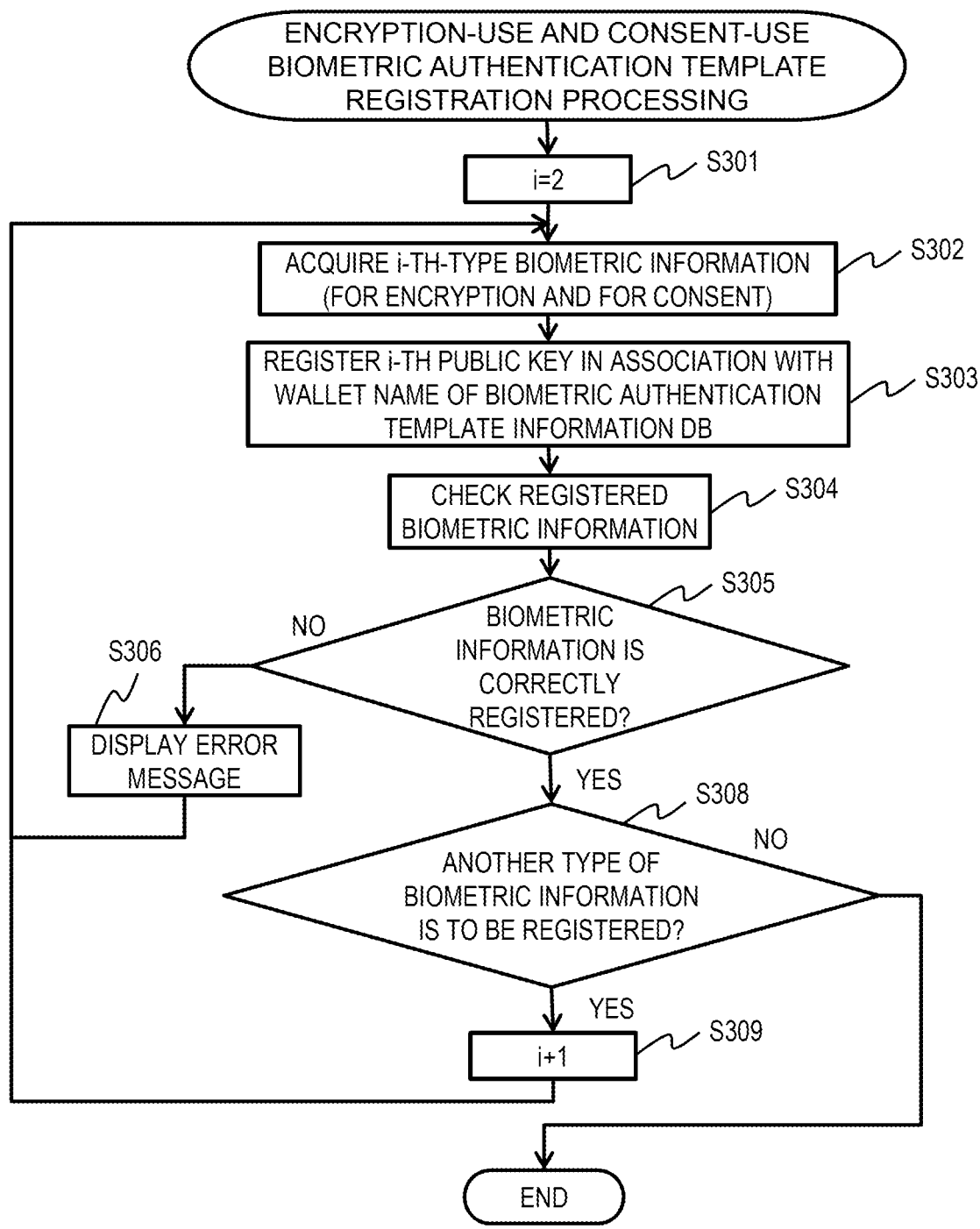
FIG. 3 is a flow chart for illustrating an example of the encryption-use and consent-use biometric authentication template registration processing according to the first embodiment.

FIG. 3 is a flow chart for illustrating an example of the encryption-use and consent-use biometric authentication template registration processing. The biometric information acquisition module 112 of the registration terminal 100 sets i to 2 (Step S301). The biometric information acquisition module 112 of the registration terminal 100 acquires, via the biometric information acquisition apparatus 107, the i-th-type biometric information (for example, an image of finger veins, a fingerprint, or a face, or a gait) for authentication of the user of the registration terminal 100 (Step S302). The type (modality) of biometric information to be registered may be specified by the user of the registration terminal 100, or by the authentication server 300.

The processing step of Step S302 further includes generation of a key pair pairing an i-th private key and an i-th public key, and, when required, i-th supplementary information (for executing error correction), by the encryption module 114, from the acquired i-th-type biometric information for encryption and/or i-th-type biometric information for consent, by the same method as the one described in Step S205 (Step S302). When a fuzzy extractor or a similar algorithm is used, the supplementary information is utilized in key generation processing based on biometric information in the encryption processing and the consent processing described later.

The encryption module 114 transmits, to the authentication server 300, the i-th public key (as well as the i-th supplementary information when generated) and information indicating from which type of biometric information the i-th public key has been generated, and the template management module 312 of the authentication server 300 registers the received i-th public key (as well as the i-th supplementary information when generated) and the received information indicating from which type of biometric information the i-th public key has been generated, in the authentication template information DB 322, in association with the specified wallet name (Step S303).

The biometric information acquisition module 112 of the registration terminal 100 displays the biometric information acquired in Step S302 on the output apparatus 106 of the registration terminal 100, and the input module 113 of the registration terminal 100 acquires a check result indicating whether the biometric information for encryption and/or the biometric information for consent is correctly registered by, for example, the user's input to the input apparatus 105, and transmits the check result to the authentication server 300 (Step S304). Specifically, in Step S304, the user of the registration terminal 100 checks, for example, whether the user of the registration terminal 100 has accidentally curled his or her finger during scanning for acquiring a finger vein image with the biometric information acquisition apparatus 107 when the i-th-type biometric information is finger veins, or whether the user of the registration terminal 100 has accidentally looked to the side during photographing of a face image with the biometric information acquisition apparatus 107 when the i-th-type biometric information is a face.

The template management module 312 determines, from the check result, whether the biometric information for encryption and/or the biometric information for consent is correctly registered (Step S305). When the template management module 312 determines from the received check result that the biometric information for encryption and/or the biometric information for consent is not correctly registered (Step S305: NO), an error message is transmitted to the registration terminal 100 to be displayed on the output apparatus 106 of the registration terminal 100 (Step S306). The process then returns to Step S302.

When the template management module 312 determines from the received check result that the biometric information for encryption and/or the biometric information for consent is correctly registered (Step S305: YES), an inquiry is issued to the registration terminal 100 about whether biometric information of another type for encryption and/or for consent is to be registered (Step S308). When the input module 113 of the registration terminal 100 determines by, for example, input from the user of the registration terminal 100, that biometric information of another type is to be registered (Step S308: YES), the value of i is incremented and the process returns to Step S302. When the input module 113 of the registration terminal 100 determines by, for example, input from the user of the registration terminal 100, that biometric information of another type for data encryption and/or for consent is not to be registered (Step S308: NO), the encryption-use and consent-use biometric authentication template registration processing is ended.

The encryption-use and consent-use biometric authentication template registration processing may be designed so that public keys each generated from one of a plurality of types of biometric information are registered each time, or so that a public key generated from only one type of biometric information is registered.

Figure 4:
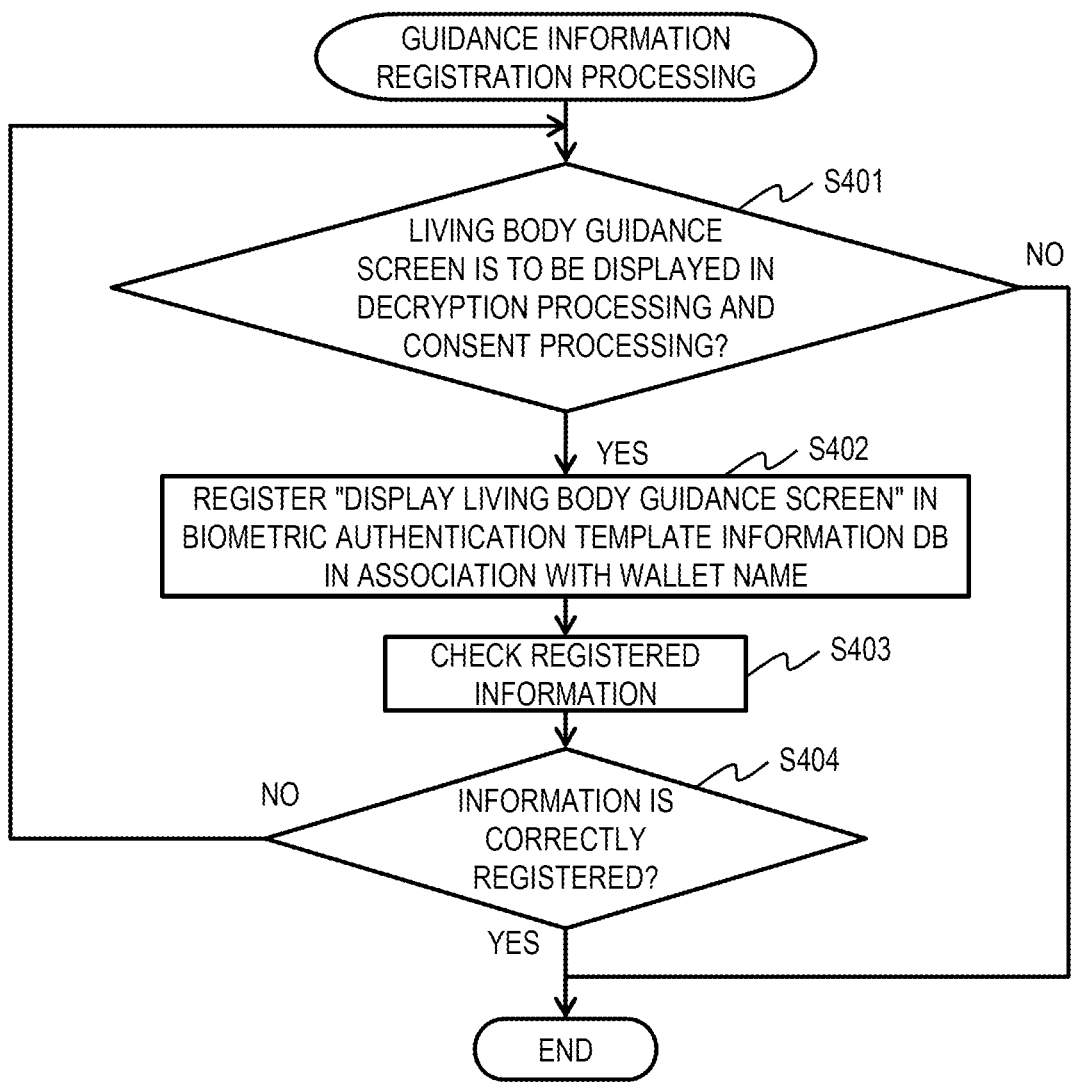
FIG. 4 is a flow chart for illustrating an example of the guidance information registration processing according to the first embodiment.

FIG. 4 is a flow chart for illustrating an example of the guidance information registration processing. The guidance management module 313 of the authentication server 300 issues an inquiry to the registration terminal 100 about whether to display a living body guidance screen in the decryption processing and the consent processing, the input module 113 of the registration terminal 100 determines whether to display the living body guidance screen by, for example, input from the user of the registration terminal 100, and transmits a result of the determination to the authentication server 300, and the guidance management module 313 determines whether to display the living body guidance screen in accordance with the received result (Step S401).

The living body guidance screen is a screen for displaying information that indicates which type of biometric information is to be acquired (which part of a living body is to be held over the biometric information acquisition apparatus 207 of the user terminal 200) in the decryption processing and the consent processing. With the guidance screen displayed in the decryption processing and the consent processing, decryption and consent are executable even when the user has forgotten which type of biometric information has been used as information on which the registration is based.

This is particularly effective in the first embodiment in which registration based on one type of biometric information out of a plurality of types of biometric information, registration based on another type of biometric information, registration based on still another type of biometric information, and so on are executable, and the user is liable to forget which type of biometric information has been used as information on which the registration is based. On the other hand, the user can choose not to display the living body guidance screen, to thereby prevent leakage of the type of biometric information used for decryption and for consent as a result of the living body guidance screen being spied over the user's shoulder.

When the guidance management module 313 determines that the living body guidance screen is not to be displayed (Step S401: NO), the guidance information registration processing is ended. When the guidance management module 313 determines that the living body guidance screen is to be displayed (Step S401: YES), information indicating that the living body guidance screen is to be displayed is registered in the authentication template information DB 322 in association with the specified wallet name (Step S402).

The guidance management module 313 transmits the information registered in Step S402 to the registration terminal 100, and the input module 113 of the registration terminal 100 acquires a check result indicating whether the information is correctly registered by, for example, input from the user to the input apparatus 105, and transmits the check result to the authentication server 300 (Step S403). The guidance management module 313 determines, from the received check result, whether the information indicating that the living body guidance screen is to be displayed is correctly registered (Step S404).

When the guidance management module 313 determines that the information indicating that the living body guidance screen is to be displayed is not correctly registered (Step S404: NO), the information registered in Step S402 is deleted, and the process returns to Step S401. When the guidance management module 313 determines that the information indicating that the living body guidance screen is to be displayed is correctly registered (Step S404: YES), the guidance information registration processing is ended.

Although whether to display the living body guidance screen is determined in the decryption processing and the consent processing in the example of FIG. 4, the authentication processing may include determination about whether the living body guidance screen is to be displayed. In other words, the living body guidance screen may be displayed in the authentication processing as well.

Figure 5:
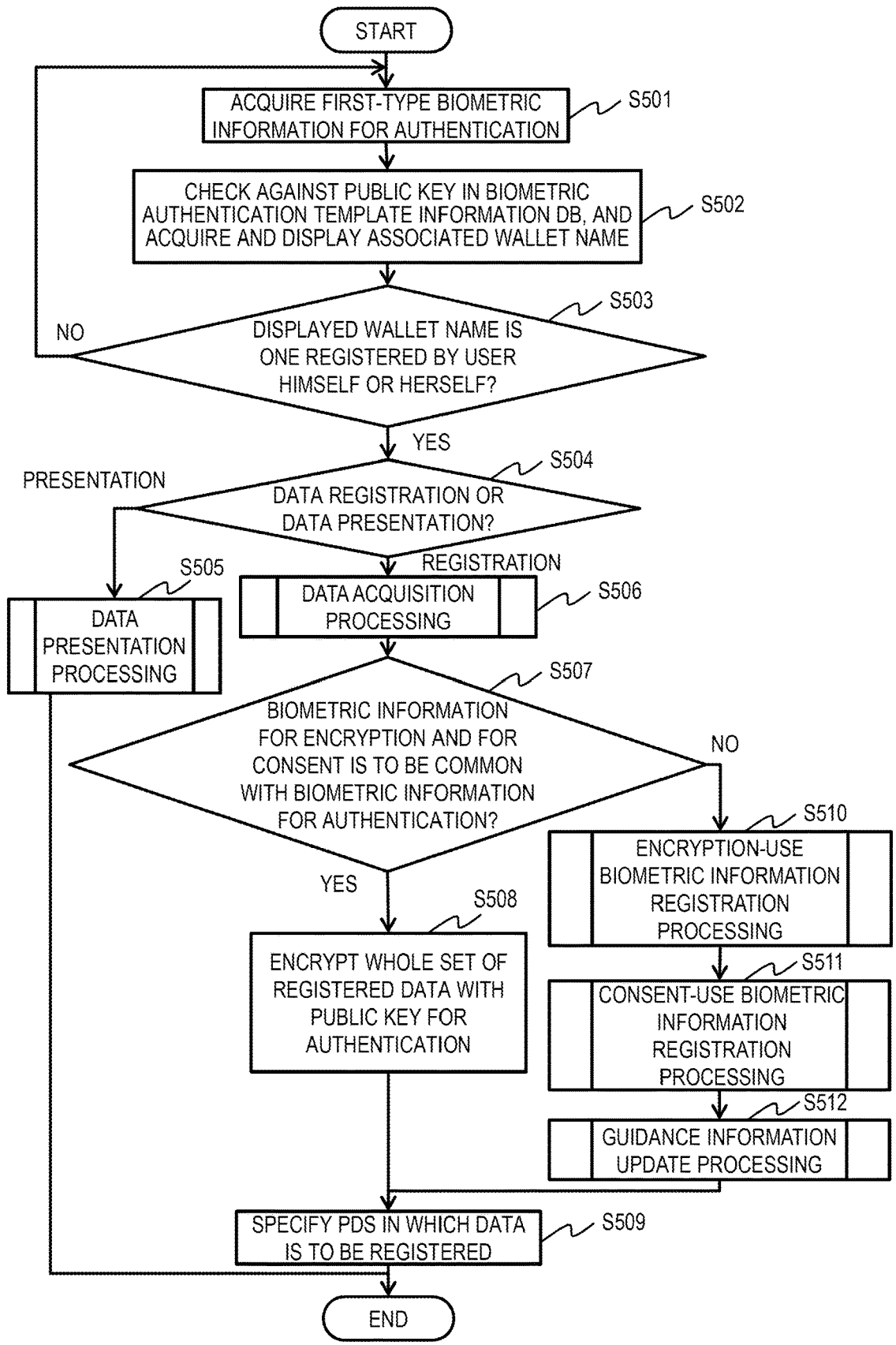
FIG. 5 is a flow chart for illustrating an example of wallet utilization processing according to the first embodiment.

FIG. 5 is a flow chart for illustrating an example of wallet utilization processing. When the registration terminal 100 and the user terminal 200 are integrated into one terminal, processing executed by the registration terminal 100 in the wallet creation processing and processing executed by the user terminal 200 in the wallet utilization processing are executed by the integrated terminal.

The biometric information acquisition module 212 of the user terminal 200 acquires, via the biometric information acquisition apparatus 207, the first-type biometric information (for authentication for access to a wallet) of a user of the user terminal 200 (Step S501). The encryption module 214 uses the same method as Step S303 to generate, from the acquired first-type biometric information, a private key and a public key and, when required, supplementary information (for executing error correction), acquires, from the authentication server 300, association between a public key and a wallet name that is stored in the template information DB 322, determines, from the acquired public key, a public key matching the generated private key based on the algorithm (a fuzzy extractor, a fuzzy signature, the PBI, or the like) employed in Step S205, and displays a wallet name associated with the determined public key on the output apparatus 206 of the user terminal 200 (Step S502).

The input module 213 of the user terminal 200 acquires a check result indicating whether the wallet name is correct by, for example, input from the user of the user terminal 200 to the input apparatus 205, and transmits the check result to the authentication server 300, and the template management module 312 of the authentication server 300 determines whether the wallet name is correct from the check result (Step S503). When the template management module 312 determines that the wallet name is incorrect (Step S503: NO), the process returns to Step S501.

The user of the user terminal 200 may execute additional identity confirmation by presenting identity confirmation information to a user of the authentication server 300 or by other ways. For the additional identity confirmation, the user of the authentication server 300 may visually check an identity confirmation document directly presented face-to-face, or the user of the authentication server 300 may check identity confirmation information transmitted by the user of the user terminal 200 from the user terminal 200 to the authentication server 300 and displayed on the output apparatus 306 of the authentication server 300.

When the user of the user terminal 200 determines that the wallet name is correct (Step S503: YES), the template management module 312 issues an inquiry to the user terminal 200 about whether data presentation processing or data acquisition processing is to be executed, the input module 213 of the user terminal 200 acquires a result indicating which of the data presentation processing and the data acquisition processing is to be executed by, for example, input from the user of the user terminal 200 to the input apparatus 205, and transmits the result to the authentication server 300, and the template management module 312 of the authentication server 300 determines, from the result, which of the data presentation processing and the data acquisition processing is to be executed (Step S504).

When the template management module 312 determines that the data presentation processing is to be executed, the data presentation processing (Step S505) in which the user terminal 200 presents data is executed, and the wallet utilization processing is then ended. Details of the data presentation processing are described later. When the template management module 312 determines that the data acquisition processing is to be executed, the process proceeds to the data acquisition processing (Step S506) in which the user terminal 200 registers data. Details of the data acquisition processing are described later.

When the data acquisition processing of Step S506 is finished, the template management module 312 of the authentication server 300 issues an inquiry to the user terminal 200 about whether the type of biometric information for encryption and the type of biometric information for consent are to be common with the type of biometric information for authentication, and the input module 213 of the user terminal 200 acquires an answer to the inquiry that reflects input from the user of the user terminal 200 to the input apparatus 205 (Step S507).

When only the first-type biometric information is acquired in the wallet creation processing (that is, when the answer selected in Step S210 is "NO"), the process skips Step S507 and proceeds to Step S508. When the input module 213 determines that the type of biometric information for encryption and the type of biometric information for consent are to be common with the type of biometric information for authentication (Step S507: YES), the encryption module 214 generates encrypted data by encrypting the whole set of data acquired in Step S506 with the public key generated in Step S502 from the first-type biometric information for authentication (Step S508).

The wallet management module 311 of the authentication server 300 acquires a PDS pointer associated with the confirmed wallet name in the personal information DB 321, and transmits the PDS pointer to the user terminal 200, to thereby specify the PDS 400 that is the registration destination of the data, the data registration module 215 of the user terminal 200 transmits the wallet name and the encrypted data to the specified PDS 400, and the wallet utilization processing is then ended (Step S509). The PDS 400 stores the encrypted data in one of the wallets 421 that has the received wallet name.

When the input module 213 determines that the type of biometric information for encryption and the type of biometric information for consent are not to be common with the type of biometric information for authentication (Step S507: NO), encryption-use biometric information registration processing (Step S510), consent-use biometric information registration processing (Step S511), and guidance information update processing (Step S512) are executed, and the process proceeds to Step S509. Details of the encryption-use biometric information registration processing, the consent-use biometric information registration processing, and the guidance information update processing are described later.

Figure 6:
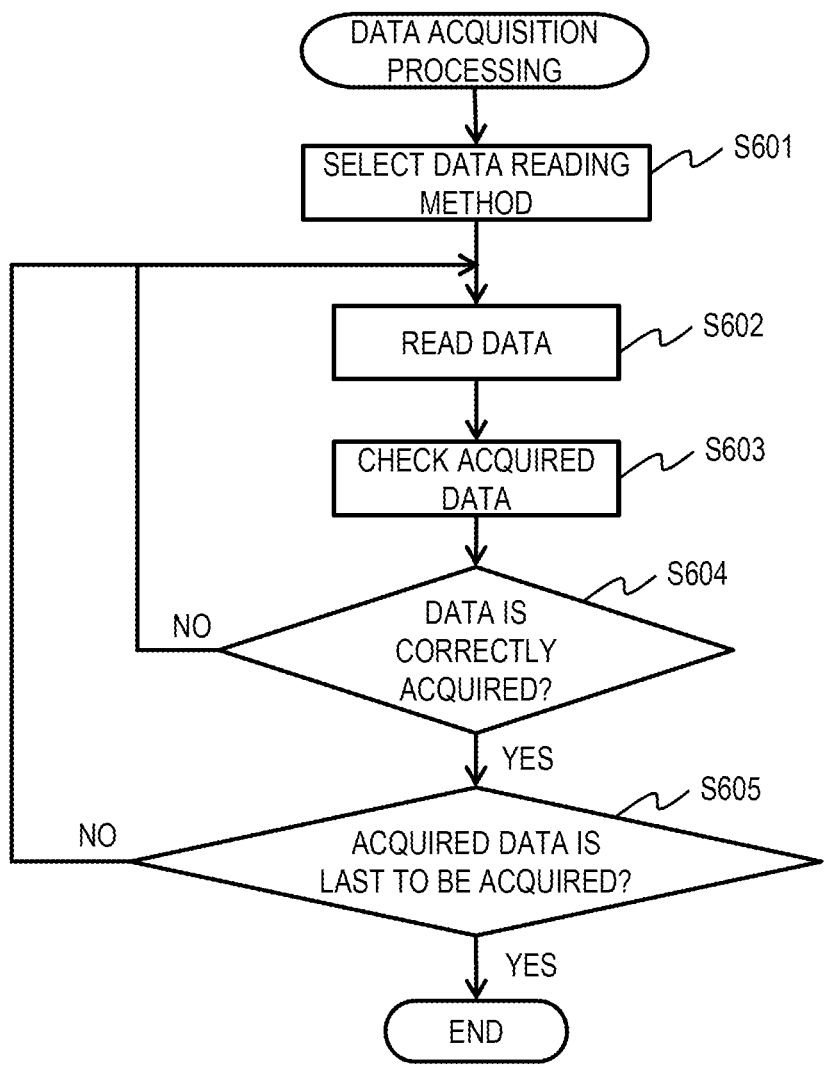
FIG. 6 is a flow chart for illustrating an example of the data acquisition processing according to the first embodiment.

FIG. 6 is a flow chart for illustrating an example of the data acquisition processing. The data registration module 215 of the user terminal 200 selects a method of reading data in accordance with input from the user of the user terminal 200 (Step S601). Examples of the method of reading data include reading of a two-dimensional code, reading of an IC chip, and scanning with a scanner. The data registration module 215 may select the method of reading data by automatically acquiring a data reading method that is executable by the data reader 208 included in the user terminal 200.

The data registration module 215 acquires, for example, data read with the data reader 208 operated by the user of the user terminal 200 (Step S602). The data registration module 215 may read data by a method other than the method in which data is read via the data reader 208, for example, a method in which data is acquired from another terminal coupled to the user terminal 200. The data acquired by the data registration module 215 may have a verifiable credential (VC) format.

The data acquired by the data registration module 215 is personal data related to, for example, attributes, qualifications, and history of the user of the user terminal 200. Examples of the personal data described above include polymerase chain reaction (PCR) test result information (negative result proof information) of the user of the user terminal 200 with respect to Covid-19, a diploma proving that the user of the user terminal 200 has acquired an academic degree of a certain university, past purchase history information of the user of the user terminal 200 about purchases on an electronic commerce (EC) site, and My Number (national personal identification number in Japan) information, driver license information, and health insurance certificate information of the user of the user terminal 200.

The data registration module 215 displays a result of registering the data on the output apparatus 206, acquires a check result indicating whether the data is correctly registered by input from the user of the user terminal 200 to the input apparatus 205, and performs determination on the check result (Step S603).

The data registration module 215 determines whether the data has correctly been acquired based on the check result (Step S604). When the data registration module 215 determines that the data is not correctly registered (Step S604: NO), the process returns to Step S602. When the data is determined to have correctly been acquired (Step S604: YES), the data registration module 215 displays an inquiry about whether the acquired data is the last data to be acquired on the output apparatus 206, acquires an answer to the inquiry by input from the user of the user terminal 200 to the input apparatus 205, and performs determination on the answer (Step S605).

When the data registration module 215 determines that the acquired data is the last data to be acquired based on the answer (Step S605: YES), the data acquisition processing is ended. When the data registration module 215 determines that there is still data to be acquired based on the answer (Step S605: NO), the process returns to Step S602.

Figure 7:
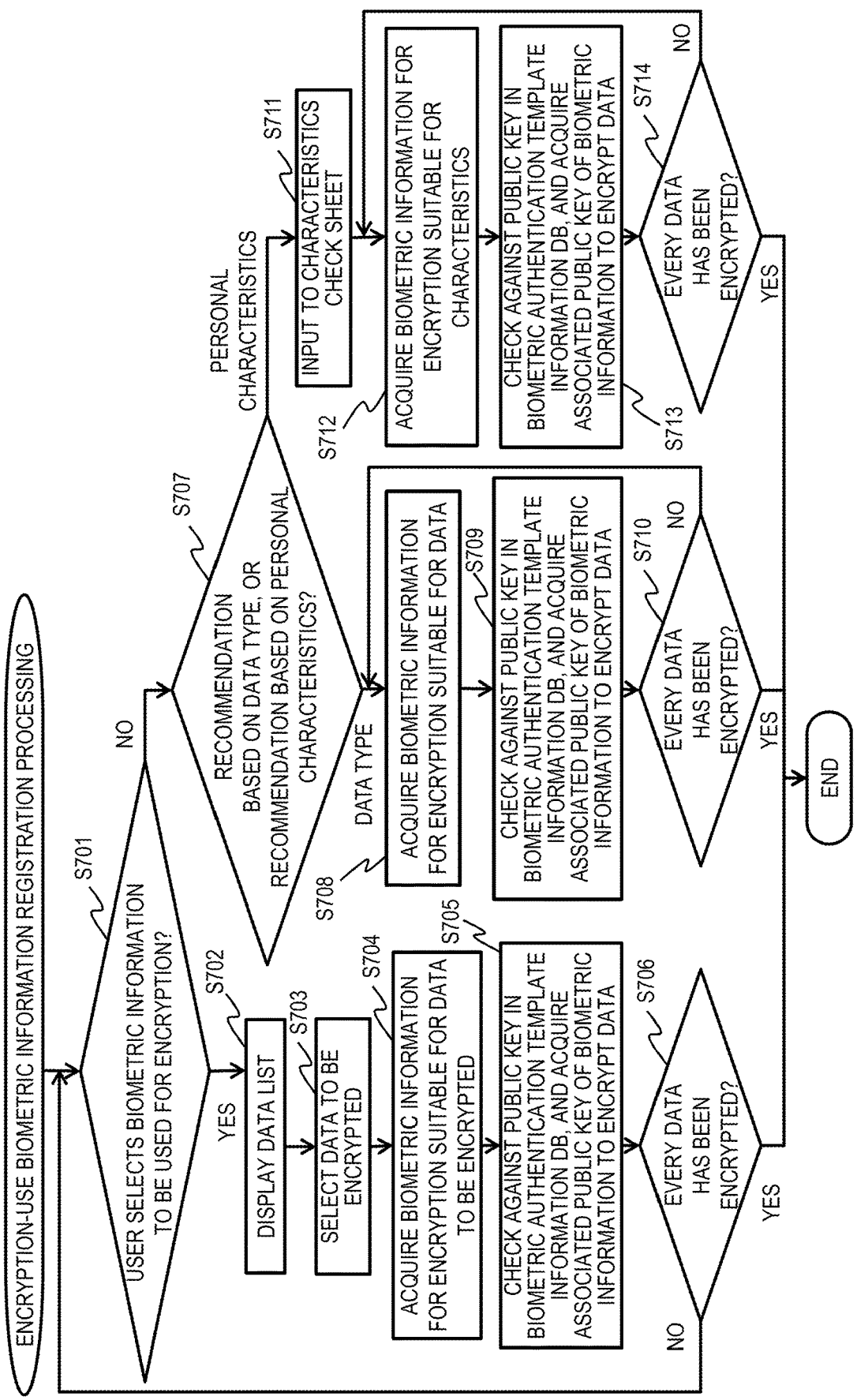
FIG. 7 is a flow chart for illustrating an example of the encryption-use biometric information registration processing according to the first embodiment.

FIG. 7 is a flow chart for illustrating an example of the encryption-use biometric information registration processing. The biometric information selection module 216 of the user terminal 200 displays, for example, information that is an inquiry about whether the user of the user terminal 200 wishes to select the type of biometric information to be used for encryption on the output apparatus 206, and acquires an answer to the inquiry by input from the user of the user terminal 200 to the input apparatus 205 (Step S701).

When it is determined from the answer that the user of the user terminal 200 is to select the type of biometric information to be used for encryption (Step S701: YES), the biometric information selection module 216 displays a data list that is a list of pieces of data acquired in the data acquisition processing on the output apparatus 206 (Step S702). The biometric information selection module 216 receives selection of data to be encrypted that is selected from the data list by input from the user of the user terminal 200 to the input apparatus 205 (Step S703).

The biometric information selection module 216 receives specification of a type of biometric information for encrypting the selected data to be encrypted, by input from the user of the user terminal 200 to the input apparatus 205, and the biometric information acquisition module 212 acquires the specified type of biometric information via the biometric information acquisition apparatus 207 (Step S704). The biometric information selection module 216 may issue an inquiry to the authentication server 300 about types of the user's biometric information registered in the authentication template information DB 322 so as to receive only specification of a type from among the types of the registered biometric information, or may receive specification of a new biometric information type.

The encryption module 214 generates, from the biometric information acquired in Step S704, a pair of a private key and a public key by, for example, the same method as the method described in Step S205, acquires a public key stored in the template information DB 322 from the authentication server 300, determines, from the acquired public key, a public key matching the generated private key based on the algorithm (a fuzzy extractor, a fuzzy signature, the PBI, or the like) employed in Step S205, and encrypts the selected data to be encrypted with the determined public key or with the public key generated from the biometric information acquired in Step S704 (Step S705).

The biometric information selection module 216 determines whether every data has been encrypted (Step S706). When the biometric information selection module 216 determines that not every data has been encrypted (Step S706: NO), the process returns to Step S701. When the biometric information selection module 216 determines that no data is left unencrypted (Step S706: YES), the encryption-use biometric information registration processing is ended.

When it is determined from the answer acquired in Step S701 that the type of biometric information to be used for encryption is not to be selected by the user of the user terminal 200 (Step S701: NO), the biometric information selection module 216 displays, for example, information that is an inquiry about whether the type of biometric information to be used for encryption is to be determined by recommendation based on the type of the data, or by personal characteristics of the user of the user terminal 200 on the output apparatus 206, and acquires an answer to the inquiry by input from the user of the user terminal 200 to the input apparatus 205 (Step S707).

When it is determined from the answer that the type of biometric information to be used for encryption is to be determined by recommendation based on the type of the data (Step S707: data type), the biometric information selection module 216 acquires, via the biometric information acquisition apparatus 207, for each piece of data to be encrypted, a type of biometric information associated with the data to be encrypted, in accordance with predetermined association between a data type and a type of biometric information to be used for encryption (Step S708).

To give an example, when the data to be encrypted is data that poses a great risk by its leakage, for instance, a driver license and other public certificates, a type of biometric information that is hard to mimic, such as finger veins, may be associated with the data to be encrypted and, when the data to be encrypted is data that does not pose much risk by its leakage, for instance, a reward point card of a shop, a password or a similar type of information that is easily acquired may be associated with the data to be encrypted (such low-risk information may not be encrypted in the first place).

The encryption module 214 generates, from each piece of biometric information acquired in Step S708, a pair of a private key and a public key by, for example, the same method as the method described in Step S205, acquires a public key stored in the template information DB 322 from the authentication server 300, determines, from the acquired public key, for each generated private key, a public key matching the generated private key based on the algorithm (a fuzzy extractor, a fuzzy signature, the PBI, or the like) employed in Step S205, and performs encryption on each piece of data to be encrypted by encrypting the data to be encrypted with the determined public key corresponding to this data to be encrypted, or with the public key generated from the biometric information that has been acquired in Step S708 for this data to be encrypted (Step S709).

The biometric information selection module 216 determines whether every data has been encrypted (Step S710). When the biometric information selection module 216 determines that not every data has been encrypted (Step S710: NO), the process returns to Step S708. When the biometric information selection module 216 determines that no data is left unencrypted (Step S710: YES), the encryption-use biometric information registration processing is ended.

When it is determined from the answer acquired in Step S707 that the type of biometric information to be used for encryption is to be determined by personal characteristics of the user of the user terminal 200 (Step S707: personal characteristics), the biometric information selection module 216 displays the characteristics check sheet 221 on the output apparatus 206 to receive input to the characteristics check sheet 221 from the user via the input apparatus 205 (Step S711).

The biometric information selection module 216 determines a type of biometric information for encryption that is associated with the data to be encrypted, based on a result of the input to the characteristics check sheet 221, and the biometric information acquisition module 212 acquires each determined type of biometric information via the biometric information acquisition apparatus 207 (Step S712). An example of the characteristics check sheet 221 and an example of a method of determining a type of biometric information for encryption that is associated with the data to be encrypted based on the input to the characteristics check sheet 221 are described later.

The encryption module 214 generates, from each piece of biometric information acquired in Step S712, a pair of a private key and a public key by, for example, the same method as the method described in Step S205, acquires a public key stored in the template information DB 322 from the authentication server 300, determines, from the acquired public key, for each generated private key, a public key matching the generated private key based on the algorithm (a fuzzy extractor, a fuzzy signature, the PBI, or the like) employed in Step S205, and performs encryption on each piece of data to be encrypted by encrypting the data to be encrypted with the determined public key corresponding to this data to be encrypted, or with the public key generated from the biometric information that has been acquired in Step S712 for this data to be encrypted (Step S713).

The biometric information selection module 216 determines whether every data has been encrypted (Step S714). When the biometric information selection module 216 determines that not every data has been encrypted (Step S714: NO), the process returns to Step S712. When the biometric information selection module 216 determines that no data is left unencrypted (Step S714: YES), the encryption-use biometric information registration processing is ended. A plurality of types of biometric information for encryption may be used to encrypt one type of data.

Figure 8:
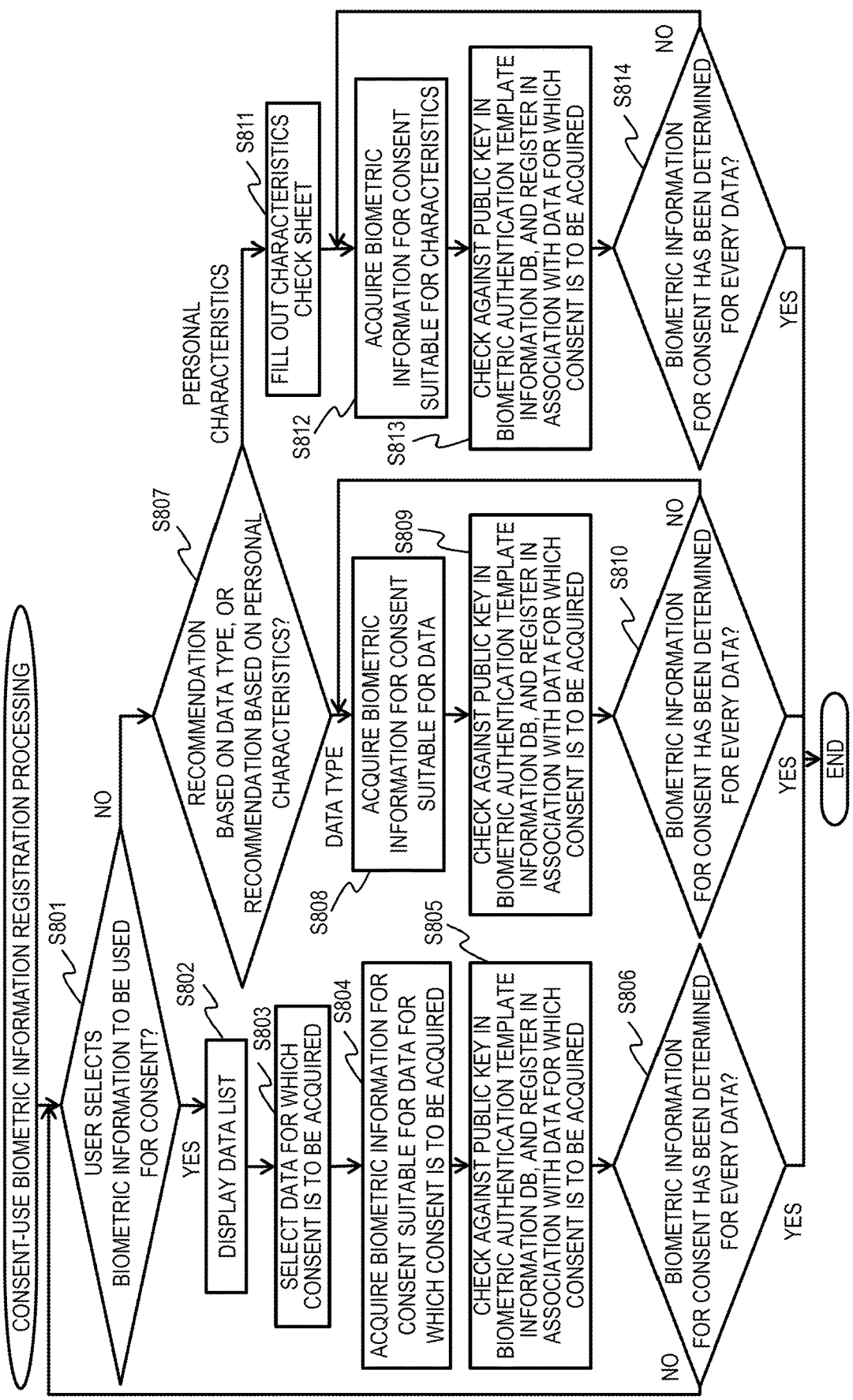
FIG. 8 is a flow chart for illustrating an example of the consent-use biometric information registration processing according to the first embodiment.

FIG. 8 is a flow chart for illustrating an example of the consent-use biometric information registration processing. The biometric information selection module 216 of the user terminal 200 displays, for example, information that is an inquiry about whether the user of the user terminal 200 wishes to select the type of biometric information to be used for consent on the output apparatus 206, and acquires an answer to the inquiry by input from the user of the user terminal 200 to the input apparatus 205 (Step S801).

When it is determined from the answer that the type of biometric information to be used for consent is to be selected by the user of the user terminal 200 (Step S801: YES), the biometric information selection module 216 displays a data list that is a list of pieces of data acquired in the data acquisition processing on the output apparatus 206 (Step S802). The biometric information selection module 216 receives selection of data for which consent is to be acquired from the data list by input from the user of the user terminal 200 to the input apparatus 205 (Step S803).

The biometric information selection module 216 receives specification of a type of biometric information for consenting to a purpose of use of the selected data for which consent is to be acquired, by input from the user of the user terminal 200 to the input apparatus 205, and the biometric information acquisition module 212 acquires the specified type of biometric information via the biometric information acquisition apparatus 207 (Step S804).

The biometric information acquisition module 212 generates, from the biometric information acquired in Step S804, a pair of a private key and a public key by, for example, the same method as the method described in Step S205, acquires a public key stored in the template information DB 322 from the authentication server 300, determines, from the acquired public key, a public key matching the generated private key based on the algorithm (a fuzzy extractor, a fuzzy signature, the PBI, or the like) employed in Step S205, and notifies the determined private key, and the template management module 312 of the authentication server 300 registers information indicating the data for which consent is to be acquired and information indicating a type of biometric information for consent that is associated with the notified public key in the authentication template information DB 322 in association with the notified public key (Step S805).

The biometric information selection module 216 determines whether the type of biometric information for consent has been determined for every data (Step S806). When the biometric information selection module 216 determines that the type of biometric information for consent has not been determined for some data (Step S806: NO), the process returns to Step S801. When the biometric information selection module 216 determines that the type of biometric information for consent has been determined for every data (Step S806: YES), the consent-use biometric information registration processing is ended.

When it is determined from the answer acquired in Step S801 that the type of biometric information to be used for consent is not to be selected by the user of the user terminal 200 (Step S801: NO), the biometric information selection module 216 displays, for example, information that is an inquiry about whether the type of biometric information to be used for consent is to be determined by recommendation based on the type of the data, or by personal characteristics of the user of the user terminal 200 on the output apparatus 206, and acquires an answer to the inquiry by input from the user of the user terminal 200 to the input apparatus 205 (Step S807).

When it is determined from the answer that the type of biometric information to be used for consent is to be determined by recommendation based on the type of the data (Step S807: data type), the biometric information selection module 216 acquires, via the biometric information acquisition apparatus 207, for each piece of data for which consent is to be acquired, a type of biometric information associated with the data for which consent is to be acquired, in accordance with predetermined association between a data type and a type of biometric information to be used for consent (Step S808).

To give an example, when the data for which consent is to be acquired is data that poses a great risk by its leakage, for instance, a driver license and other public certificates, a type of biometric information that is hard to mimic, such as finger veins, may be associated with the data for which consent is to be acquired and, when the data for which consent is to be acquired is data that does not pose much risk by its leakage, for instance, a reward point card of a shop, a password or a similar type of information that is easily acquired may be associated with the data for which consent is to be acquired (such low-risk information may not be encrypted in the first place).

The biometric information acquisition module 212 generates, from each piece of biometric information acquired in Step S808, a pair of a private key and a public key by, for example, the same method as the method described in Step S205, acquires a public key stored in the template information DB 322 from the authentication server 300, determines, from the acquired public key, for each generated private key, a public key matching the generated private key based on the algorithm (a fuzzy extractor, a fuzzy signature, the PBI, or the like) employed in Step S205, and notifies each determined public key, and the template management module 312 of the authentication server 300 registers, for each piece of data for which consent is to be acquired and for each notified public key, information indicating the data for which consent is to be acquired and information indicating a type of biometric information for consent that is associated with the notified public key in the authentication template information DB 322 in association with the notified public key (Step S809).

The biometric information selection module 216 determines whether the type of biometric information for consent has been determined for every data (Step S810). When the biometric information selection module 216 determines that the type of biometric information for consent has not been determined for some data (Step S810: NO), the process returns to Step S808. When the biometric information selection module 216 determines that the type of biometric information for consent has been determined for every data (Step S810: YES), the consent-use biometric information registration processing is ended.

When it is determined from the answer acquired in Step S807 that the type of biometric information to be used for consent is to be determined by personal characteristics of the user of the user terminal 200 (Step S807: personal characteristics), the biometric information selection module 216 displays the characteristics check sheet 221 on the output apparatus 206 to receive input to the characteristics check sheet 221 from the user via the input apparatus 205 (Step S811).

The biometric information selection module 216 determines a type of biometric information for consent that is associated with the data for which consent is to be acquired, based on a result of the input to the characteristics check sheet 221, and the biometric information acquisition module 212 acquires each determined type of biometric information via the biometric information acquisition apparatus 207 (Step S812). An example of the characteristics check sheet 221 and an example of a method of determining a type of biometric information for consent that is associated with the data for which consent is to be acquired based on the input to the characteristics check sheet 221 are described later.

The biometric information acquisition module 212 generates, from each piece of biometric information acquired in Step S812, a pair of a private key and a public key by, for example, the same method as the method described in Step S205, acquires a public key stored in the template information DB 322 from the authentication server 300, determines, from the acquired public key, for each generated private key, a public key matching the generated private key based on the algorithm (a fuzzy extractor, a fuzzy signature, the PBI, or the like) employed in Step S205, and notifies each determined public key, and the template management module 312 of the authentication server 300 registers, for each piece of data for which consent is to be acquired and for each notified public key, information indicating the data for which consent is to be acquired and information indicating a type of biometric information for consent that is associated with the notified public key in the authentication template information DB 322 in association with the notified public key (Step S813).

The biometric information selection module 216 determines whether the type of biometric information for consent has been determined for every data (Step S814). When the biometric information selection module 216 determines that the type of biometric information for consent has not been determined for some data (Step S814: NO), the process returns to Step S812. When the biometric information selection module 216 determines that the type of biometric information for consent has been determined for every data (Step S814: YES), the consent-use biometric information registration processing is ended. A plurality of types of biometric information for consent may be used to give consent to one purpose of use.

FIG. 9 is an example of the characteristics check sheet 221. An example of the method of determining a type of biometric information for encryption that is associated with data to be encrypted based on input to the characteristics check sheet 221 is described below. This example for encryption applies to the method of determining a type of biometric information for consent that is associated with data for which consent is to be acquired based on input to the characteristics check sheet 221, and a description on the method is therefore omitted.

The characteristics check sheet 221 includes check items which are, for example, "prefer the required time to be short (prefer quickness)," "prefer non-taxing action (operation)," "prefer natural action (operation)," "prefer action (operation) integrated into a single action," "prefer performing one action (operation) at a time in order," "prefer a type that is safe (foolproof, hard to fake/mimic)," "prefer making a decision after looking over all options," and "cannot, or do not wish to, use some methods for personal reasons."

For example, an initial value of the number of types of biometric information for encryption and initial values of the types of biometric information for encryption are determined in advance (to give an example, the initial value of the number of types of biometric information for encryption is 2 and the initial values of the two types are "face" and "finger veins of the left hand").

For example, when "prefer the required time to be short (prefer quickness)" is selected, the biometric information selection module 216 decreases the number of types of biometric information for encryption by a predetermined number. The biometric information selection module 216 decreases the number of types of biometric information for encryption by a predetermined number by, for example, following an order of priority determined in advance for the types of biometric information for encryption to be decreased when the number of types of biometric information for encryption is decreased by the predetermined number.

For example, when "prefer non-taxing action (operation)" is selected, the biometric information selection module 216 deletes any type of biometric information for encryption that is higher in a (predetermined) level of difficulty of action for acquiring biometric information than a predetermined value, and adds, at least, a type of biometric information for encryption that has the lowest level of difficulty of action. To give an example, a face, an iris, and other types of biometric information that can be acquired by simply placing a user in front of a camera are low in the level of difficulty of action, and a gait and other types of biometric information that require a fair amount of action on the user's part to acquire are high in the level of difficulty of action.

For example, when "prefer natural action (operation)" is selected, the biometric information selection module 216 excludes predetermined combinations of types of biometric information, for example, a combination of "face" and "finger veins of the right hand or the left hand," from biometric information for encryption (a type of biometric information that is only a part of the combinations of types of biometric information may be included in biometric information for encryption). When "face" and "finger veins of the right hand or the left hand" are to be acquired, for example, those pieces of biometric information can be acquired at once by concurrent presentation of the user's face and finger veins to a camera, with the user placing the palm of one hand along a side of his or her face, or pressing the back of one hand against his or her forehead. However, some users may feel embarrassed at performing such an unnatural action in front of other people, and it is therefore recommended to include this or a similar check item.

For example, when "prefer action (operation) integrated into a single action" is selected, the biometric information selection module 216 includes predetermined combinations of types of biometric information (to give an example, combinations of types of biometric information that can be acquired by the same action), for example, a combination of "finger veins of the left hand" and "finger veins of the right hand," among biometric information for encryption. In this case, the biometric information selection module 216 may delete types of biometric information for encryption that are not included in the combinations.

For example, when "prefer performing one action (operation) at a time in order" is selected, the biometric information selection module 216 deletes, from biometric information for encryption, at least one of types of biometric information that form a predetermined combination (a combination of types of biometric information that can be acquired by a single action through photographing of a face with a camera), for example, a combination of "face" and "iris." When "prefer performing one action (operation) at a time in order" is not selected, on the other hand, this is interpreted as selection of "prefer action (operation) integrated into a single action," and predetermined combinations of types of biometric information (combinations of types of biometric information that can be acquired by a single action through photographing of a face with a camera), for example, a combination of "face" and "iris," are added to biometric information for encryption.

For example, when "prefer performing one action (operation) at a time in order" is selected and biometric information for encryption includes predetermined combinations of types of biometric information that can be acquired at the same time, for example, a combination of "face" and "finger veins of the right hand or the left hand," the biometric information selection module 216 determines the biometric information for encryption so that "finger veins of the right hand or the left hand" are acquired after acquisition of "face" is finished, or so that "face" is acquired after acquisition of "finger veins of the right hand or the left hand" is finished, instead of acquiring "face" and "finger veins of the right hand or the left hand" by concurrently presenting the former and the latter to a camera.

For example, when "prefer a type that is safe (foolproof, hard to fake/mimic)" is selected, the biometric information selection module 216 deletes, from biometric information for encryption, any type of biometric information that is lower in a security level determined in advance for each type of biometric information than a predetermined value, and adds at least a type of biometric information that has the highest security level to the biometric information for encryption.

For example, when "prefer making a decision after looking over all options" is selected, the biometric information selection module 216 displays information indicating all types of biometric information usable as biometric information for encryption on the output apparatus 206, and then determines biometric information for encryption based on input from the user of the user terminal 200 to the input apparatus 205, or requests the user to input to the characteristics check sheet 221 again.

For example, when "cannot, or do not wish to, use some methods for personal reasons" is selected, the biometric information selection module 216 requests the user of the user terminal 200 to specify a living body part from which biometric information is not to be acquired, and deletes biometric information for encryption that is associated in advance with the specified living body part. The user may not be allowed to, or may not wish to, expose a living body part from which biometric information is acquired for reasons related to religion, occupation, or race, or due to disability, an injury, or an illness, or a living body part from which biometric information is acquired may be damaged or lost.

The biometric information selection module 216 may assign, in a random manner, types of biometric information for encryption that have been determined based on the characteristics check sheet 221 to pieces of data to be encrypted, or may assign a type of biometric information for encryption that has the highest security level among the determined types of biometric information for encryption to encrypted data that is desired to be presented more safely (for example, which encrypted data is to be presented more safely is specified by the user of the user terminal 200).

The user terminal 200 may use a questionnaire method or the like with respect to a personality and a disposition of the user of the user terminal 200 to acquire results indicating the user's characteristics and sense of values, and transmit the results to the authentication server 300. The biometric information selection module 216 of the authentication server 300 may determine biometric information for encryption based on this result.

Figure 10:
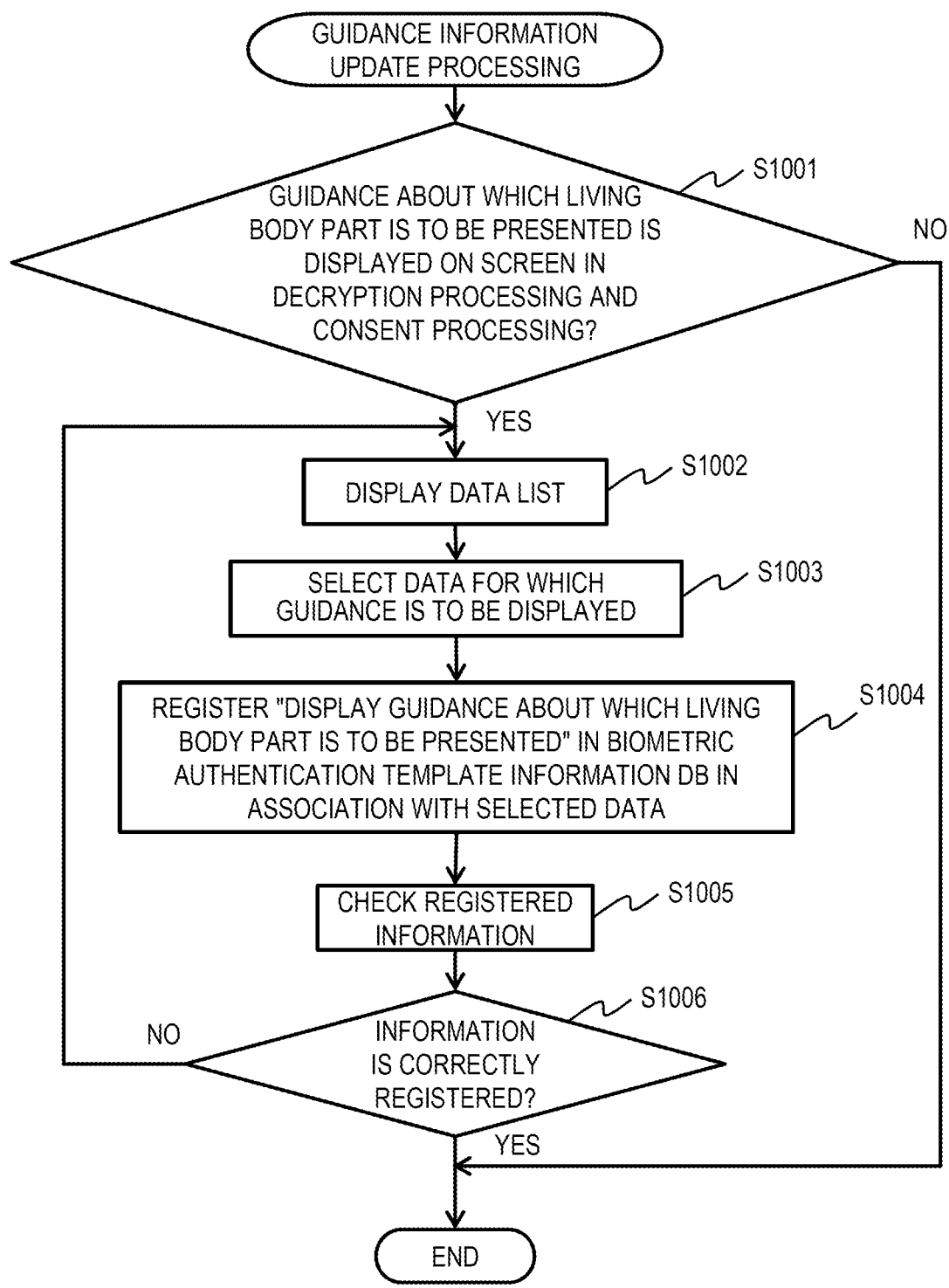
FIG. 10 is a flow chart for illustrating an example of the guidance information update processing according to the first embodiment.

FIG. 10 is a flow chart for illustrating an example of the guidance information update processing. The guidance management module 313 of the authentication server 300 determines whether to display the living body guidance screen by referring to the authentication template information DB 322 and determining whether the information indicating that the living body guidance screen is to be displayed is associated with the confirmed wallet name (Step S1001).

When the guidance management module 313 determines that the living body guidance screen is not to be displayed (Step S1001: NO), the guidance information update processing is ended. When it is determined that the living body guidance screen is to be displayed (Step S1001: YES), the guidance management module 313 issues a request to display a data list that is a list of pieces of data acquired in the data acquisition processing on the output apparatus 206 (Step S1002).

The guidance management module 313 requests the user terminal 200 to select data for which guidance is to be displayed from among the pieces of data on the data list, and the input module 213 of the user terminal 200 acquires, by input from the user of the user terminal 200 to the input apparatus 205, a result of selecting data for which guidance is to be displayed, and transmits the result to the authentication server 300 (Step S1003).

The guidance management module 313 registers, in the authentication template information DB 322, information that indicates the data selected in the selection result and that is associated with the confirmed wallet name in association with the information indicating that the living body guidance screen is to be displayed (Step S1004).

The guidance management module 313 transmits the information registered in Step S1004 to the user terminal 200, and the input module 213 of the user terminal 200 acquires a check result indicating whether the information is correctly registered by, for example, input from the user to the input apparatus 205, and transmits the check result to the authentication server 300 (Step S1005). The guidance management module 313 determines, from the received check result, whether the information indicating that the living body guidance screen is to be displayed is correctly registered (Step S1006).

When it is determined that the information indicating that the living body guidance screen is to be displayed is not correctly registered (Step S1006: NO), the guidance management module 313 deletes the information registered in Step S1004, and the process returns to Step S1002. When the guidance management module 313 determines that the information indicating that the living body guidance screen is to be displayed is correctly registered (Step S1006: YES), the guidance information update processing is ended.

The guidance information update processing may be designed so that whether to display the living body guidance screen can be selected for all pieces of data on the data list at once, or so that the living body guidance screen can be displayed for some of the pieces of data on the data list. The guidance information update processing may also be designed so that the living body guidance screen can be displayed for only one of encryption and consent of the pieces of data on the data list.

Figure 11:
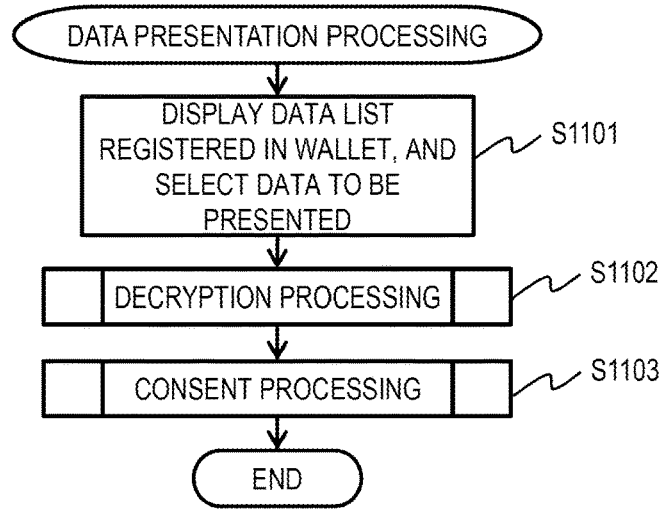
FIG. 11 is a flow chart for illustrating an example of the data presentation processing according to the first embodiment.

FIG. 11 is a flow chart for illustrating an example of the data presentation processing. The template management module 312 of the authentication server 300 transmits, to the user terminal 200, a data list that is a list of pieces of data acquired in the data acquisition processing to display the data list on the output apparatus 206, and the input module 213 of the user terminal 200 selects data to be presented (encrypted data encrypted with a public key) by input from the user of the user terminal 200 to the input apparatus 205, and transmits a result of the selection to the authentication server 300 (Step S1101).

In Step S1101, the template management module 312 further requests the PDS 400 pointed by a PDS pointer associated with the confirmed wallet name in the personal information DB 321 to transmit, to the user terminal 200, the data to be presented which is indicated by the received selection result and which is included in the wallet 421 having the confirmed wallet name, and the data management module 413 of this PDS 400 transmits the data to be presented to the user terminal 200. In Step S1101, the template management module 312 of the authentication server 300 further acquires a public key associated with the data to be presented in the authentication template information DB 322, and transmits the public key to the user terminal 200.

The user terminal 200 executes the decryption processing (Step S1102) for the data to be presented, and executes the consent processing (Step S1103) for the decrypted data to be presented. The data presentation processing is then ended. Details of the decryption processing and the consent processing are described later.

Figure 12:
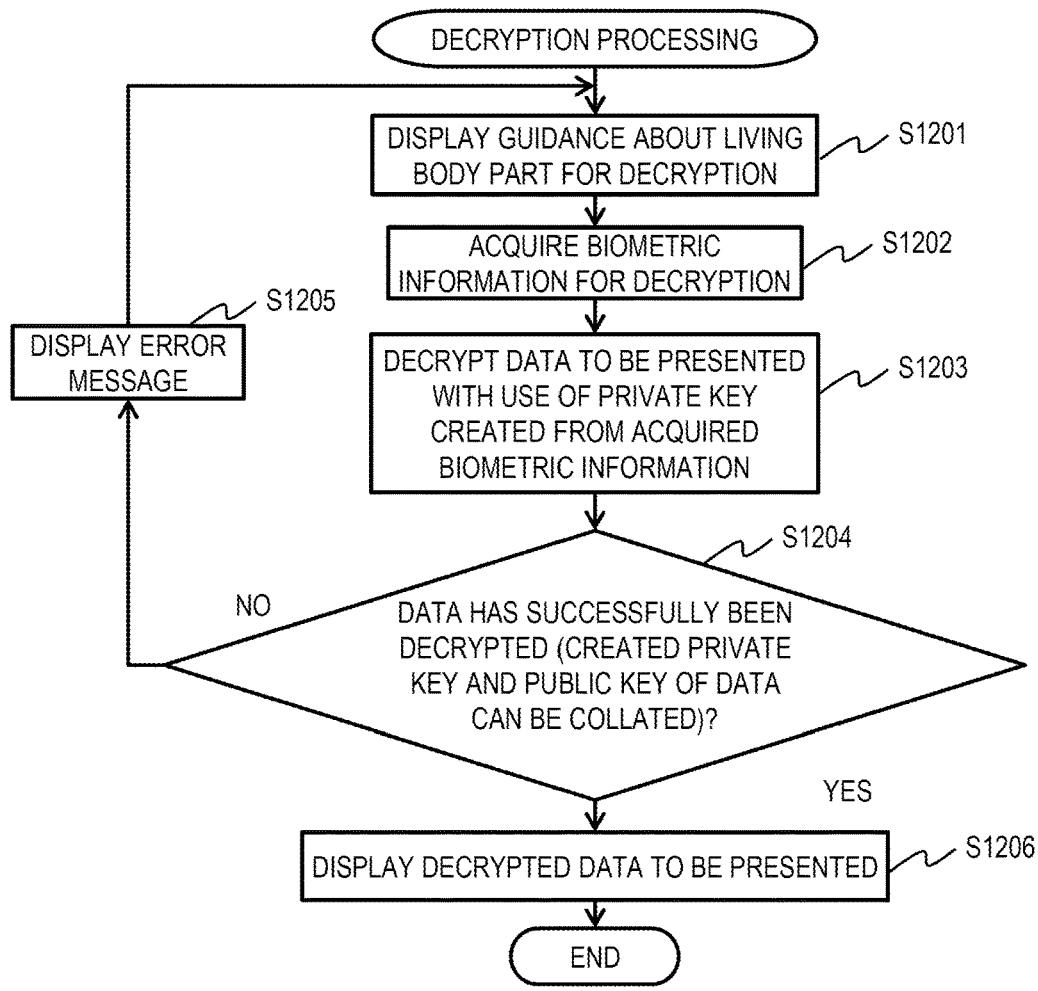
FIG. 12 is a flow chart for illustrating an example of the decryption processing according to the first embodiment.

FIG. 12 is a flow chart for illustrating an example of the decryption processing. The guidance management module 313 refers to the authentication template information DB 322 and, when the data to be presented that is being processed is associated with the information indicating that the living body guidance screen is to be displayed, displays the living body guidance screen (that is, a screen displaying information indicating which part of a living body is to be held over the biometric information acquisition apparatus 207) on the output apparatus 206 of the user terminal 200 (Step S1201).

When the data to be presented that is being processed is not associated with the information indicating that the living body guidance screen is to be displayed, the process proceeds to Step S1202 without the guidance management module 313 displaying the living body guidance screen (that is, without the processing step of Step S1201 being executed).

The biometric information acquisition module 212 acquires biometric information for decryption (the same type of biometric information as the biometric information for encryption) via the biometric information acquisition apparatus 207 (Step S1202). When it is determined in Step S507 that the type of biometric information for encryption and the type of biometric information for consent are to be common with the type of biometric information for authentication, the first-type biometric information acquired in Step S501 for authentication is used as biometric information for decryption, and the processing step of Step S1202 is accordingly not executed.

The encryption module 214 generates a pair of a private key and a public key from the biometric information for decryption by, for example, the same method as the method described in Step S205, and decrypts the data to be presented with the generated private key (Step S1203).

The encryption module 214 determines whether the data to be presented has successfully been decrypted, that is, whether the private key generated in Step S1202 and the public key acquired in Step S1101 match, based on, for example, the algorithm (a fuzzy extractor, a fuzzy signature, the PBI, or the like) employed in Step S205 (Step S1204).

When the encryption module 214 determines that the data to be presented has unsuccessfully been decrypted (Step S1204: NO), an error message is displayed on the output apparatus 206 (Step S1205), and the process returns to Step S1201. When the encryption module 214 determines that the data to be presented has successfully been decrypted (Step S1204: YES), the decrypted data to be presented is displayed on the output apparatus 206 (Step S1206), and the decryption processing is ended.

Figure 13:
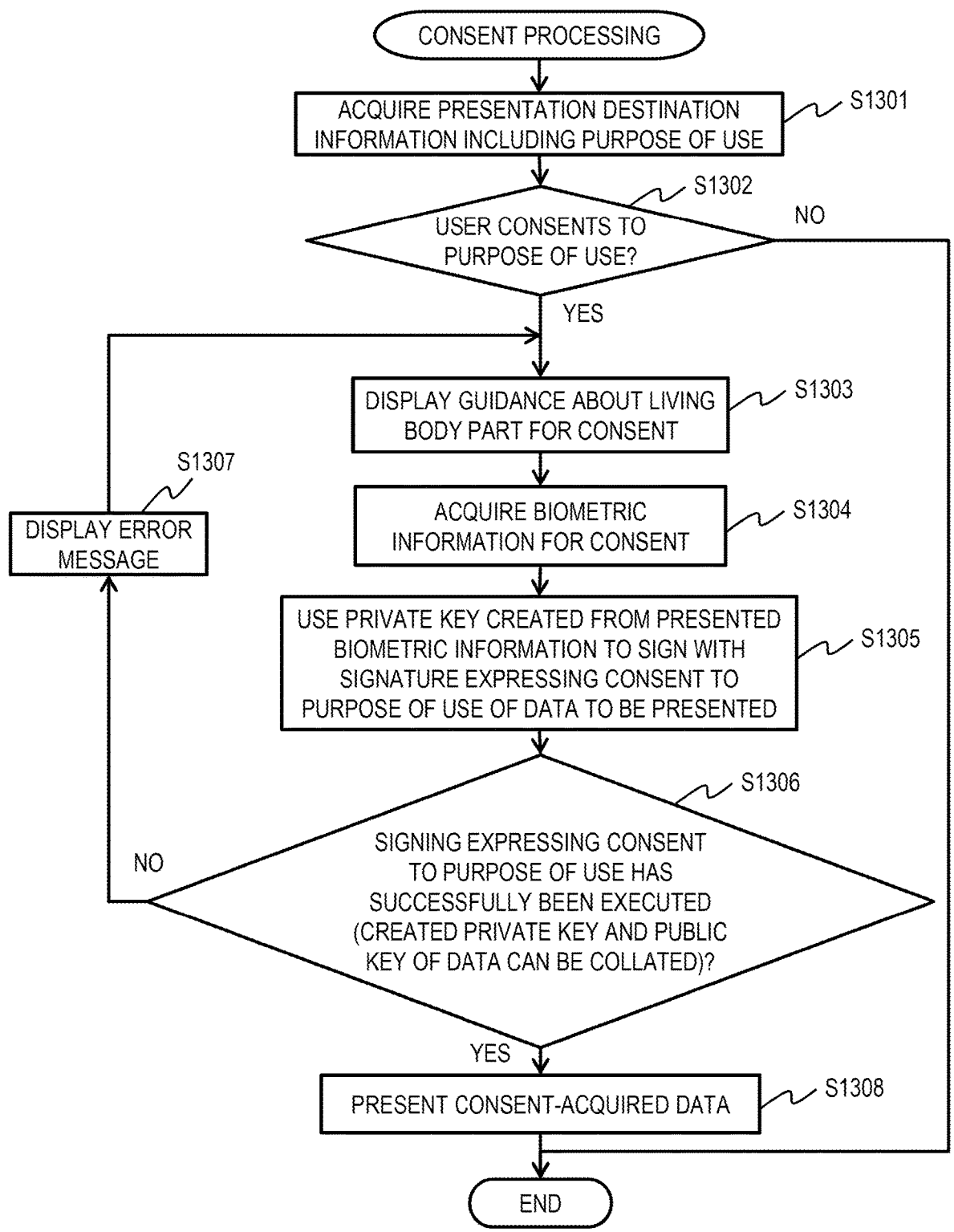
FIG. 13 is a flow chart for illustrating an example of the consent processing according to the first embodiment.

FIG. 13 is a flow chart for illustrating an example of the consent processing. The consent module 217 of the user terminal 200 acquires data presentation destination information including, for example, information that indicates a purpose of use of data and a destination to which data is presented (Step S1301). For example, when the user terminal 200 is owned by a business organization or a similar organization that is the data presentation destination, the data presentation destination information may be stored in advance in the auxiliary storage apparatus 203. When a terminal that is the data presentation destination is an external terminal, the consent module 217, for example, acquires the data presentation destination information from the external terminal.

The consent module 217 determines whether the user of the user terminal 200 consents to the purpose of use based on input from the user to the input apparatus 205 (Step S1302). The consent module 217 may check about not only consent to the purpose of use but also consent to the presentation destination of the data and a time of presentation of the data (both are included in, for example, the data presentation destination information), and the like. When it is determined that the user does not consent to the purpose of use (Step S1302: NO), the consent module 217 does not present data to the data presentation destination and further deletes the data to be presented decrypted in Step S1203 and the private key generated in Step S1203 which are held in the user terminal 200. The consent processing is then ended.

When the consent module 217 determines that the user consents to the purpose of use (Step S1302: YES), the guidance management module 313 refers to the authentication template information DB 322 and, when the data to be presented that is being processed is associated with the information indicating that the living body guidance screen is to be displayed, displays the living body guidance screen (that is, a screen displaying information indicating which part of a living body is to be held over the biometric information acquisition apparatus 207) on the output apparatus 206 of the user terminal 200 (Step S1303).

When the data to be presented that is being processed is not associated with the information indicating that the living body guidance screen is to be displayed, the process proceeds to Step S1304 without the guidance management module 313 displaying the living body guidance screen (that is, without the processing step of Step S1303 being executed).

The biometric information acquisition module 212 acquires the biometric information for consent via the biometric information acquisition apparatus 207 (Step S1304). When it is determined in Step S507 that the type of biometric information for encryption and the type of biometric information for consent are to be common with the type of biometric information for authentication, the first-type biometric information acquired in Step S501 for authentication is used as the biometric information for consent, and the processing step of Step S1304 is accordingly not executed.

The encryption module 214 generates a pair of a private key and a public key from the biometric information for consent by, for example, the same method as the method described in Step S205, and uses the generated private key to sign with an electronic signature expressing a consent to the purpose of use of the (decrypted) data to be presented (Step S1305).

The encryption module 214 determines whether the signing expressing a consent to the purpose of use of the decrypted data to be presented has successfully been executed, that is, whether the private key generated in Step S1305 and the public key acquired in Step S1101 can be collated (Step S1306).

When the encryption module 214 determines that the signing expressing a consent to the purpose of use of the decrypted data to be presented has unsuccessfully been executed (Step S1306: NO), an error message is displayed on the output apparatus 206 (Step S1307), and the process returns to Step S1303. When it is determined that the signing expressing a consent to the purpose of use of the decrypted data to be presented has successfully been executed (Step S1306: YES), the encryption module 214 transmits the decrypted data to be presented signed with a signature expressing a consent to the purpose of use to the presentation destination (Step S1308), and deletes the private key generated in Step S1305. The consent processing is then ended.

As described above, the data management system according to the first embodiment generates a public key from biometric information and further stores data in the PDS 400 in a manner that requires a private key corresponding to the generated public key to decrypt the data. A user without a portable terminal (a smartphone, a tablet terminal, or the like) for executing management of data and keys can thus execute data registration processing and data presentation processing. This eliminates risks of loss and theft of the portable terminal, and enables the user without the portable terminal to use a mechanism of self-sovereign identity.

In addition, the user terminal 200 executes authentication and signing with a public key generated from biometric information of the user of the user terminal 200 himself or herself, and can accordingly prevent the user from committing an improper act in which the user transfers or sells data or, when the user terminal 200 is a portable terminal, the portable terminal in collusion with a third party.

As described above, the data management system according to the first embodiment may use one type or a plurality of types of biometric information for authentication, one type or a plurality of types of biometric information for encryption, and one type or a plurality of types of biometric information for consent. Accordingly, the users of the registration terminal 100 and the user terminal 200 may select one type of biometric information so that the type of biometric information for encryption and the type of biometric information for consent are the same as the type of biometric information for authentication, or may select a plurality of types of biometric information as biometric information for authentication and the same combination of types of biometric information as biometric information for encryption and biometric information for consent, or may select one type of biometric information as one of (A) biometric information for authentication and (B) biometric information for encryption and biometric information for consent, and a plurality of types of biometric information as another of (A) and (B), in a manner that avoids duplicative selection of types, or may select a plurality of types as types of biometric information for authentication and a plurality of types as types of biometric information for encryption and types of biometric information for consent in a manner that avoids duplicative selection of types.

The data management system according to the first embodiment determines biometric information for encryption and biometric information for consent based on the characteristics check sheet 221, thereby being capable of determining a type or types of biometric information that match the personality, characteristics, preferences, and the like of the user of the user terminal 200 as biometric information for encryption and biometric information for consent, with the result that the user is satisfied.

On the characteristics check sheet 221 in the first embodiment, types of biometric information that cannot or are not desired to be used for personal reasons can be excluded. Types of biometric information that accommodate diversity with respect to religion, disability, injuries, illnesses, occupation, race, and the like can therefore be determined.

The data management system according to the first embodiment can display the living body guidance screen and thus enables a user who has forgotten what types of biometric information are used as biometric information for authentication, biometric information for encryption, and biometric information for consent to execute authentication processing, decryption processing, and consent processing.

The data management system according to the first embodiment allows a minor and an adult who has difficulties in presenting data in person for an illness, an injury, dementia, or other reasons to transfer authority to present data to an agent. In a specific example of this case, the agent substitutes for the principal as the user of the registration terminal 100 and the user of the user terminal 200. In other words, biometric information of the agent is acquired.

In the case of a minor or a person who is able to go to a place in which the registration terminal 100 and the user terminal 200 are installed to provide biometric information but is limited in legal capacity, the minor and the agent may be treated as the user of the registration terminal 100 and the user of the user terminal 200. In other words, biometric information may be acquired from both of the minor and the agent, and the biometric information of the minor and the biometric information of the agent may be both demanded for authentication, encryption, decryption, and consent.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A data management system, comprising:
   a first computer;
   a second computer; and
   a third computer,
   the first computer being configured to, in data registration processing:
      hold data;
      determine a type of biometric information for encryption with which the data is to be encrypted;
      acquire the determined type of biometric information for encryption from a user of the first computer;
      generate, from each piece of the acquired biometric information for encryption, a public key based on a predetermined algorithm;
      encrypt the data with use of the public key;
      transmit the public key to the second computer; and
      transmit the encrypted data to the third computer,
   the first computer being configured to, in data presentation processing:
      acquire the encrypted data from the third computer;
      acquire the determined type of biometric information for decryption from the user of the first computer;
      generate, from each piece of the acquired biometric information for decryption, a private key based on the predetermined algorithm;
      decrypt the encrypted data with use of the private key; and
      present each piece of the decrypted registered data,
   wherein the first computer is configured to hold a characteristics check sheet for acquiring information indicating characteristics of the user of the first computer, and
   wherein, in the data registration processing, the first computer is configured to receive check-marking on the characteristics check sheet, and determine the type of the biometric information for encryption based on characteristics of the user of the first computer that are indicated by the check-marked characteristics check sheet.

2. The data management system according to claim 1,
wherein the first computer is coupled to an input apparatus, and
wherein, in the data registration processing, the first computer is configured to determine the type of the biometric information for encryption based on input to the input apparatus.

3. The data management system according to claim 1, wherein, in the data registration processing, the first computer is configured to determine the type of the biometric information for encryption based on a predetermined association between a data type and a type of biometric information for encryption.

4. The data management system according to claim 1, wherein the characteristics check sheet includes check items for identifying a personality of the user of the first computer which is used to determine types of the biometric information for encryption that are prohibited to be acquired from the user of the first computer, and/or the number of types of the biometric information for encryption and the types of the biometric information for encryption.

5. The data management system according to claim 1,
wherein the first computer is coupled to an input apparatus and a display apparatus,
wherein, in the data registration processing, the first computer is configured to determine, based on input to the input apparatus, whether to display a guidance screen including display of the determined type on the display apparatus when the data presentation processing is executed, and
wherein, when it is determined that the guidance screen is to be displayed, the first computer is configured to display the guidance screen on the display apparatus in the data presentation processing before the determined type of biometric information for decryption is acquired.

6. The data management system according to claim 1,
wherein, in the data registration processing, the first computer is configured to:
determine a type of biometric information for consent which is used to give consent to a purpose of use of the data;
acquire the determined type of biometric information for consent from the user of the first computer;
generate, from each piece of the acquired biometric information for consent, a public key based on a predetermined algorithm; and
transmit the public key to the second computer, and
wherein, in the data presentation processing, the first computer is configured to:
hold use purpose information indicating the purpose of use;
acquire the determined type of biometric information for consent from the user of the first computer;
generate, from each piece of the acquired biometric information for consent, a private key based on the predetermined algorithm;
attach, to the use purpose information, an electronic signature with use of the private key generated from each piece of the biometric information for consent acquired in the data presentation processing; and
present the use purpose information having the electronic signature attached thereto.

7. The data management system according to claim 6,
wherein the first computer is coupled to an input apparatus, and
wherein, in the data registration processing, the first computer is configured to determine the type of the biometric information for consent based on input to the input apparatus.

8. The data management system according to claim 6, wherein, in the data registration processing, the first computer is configured to determine the type of the biometric information for consent based on a predetermined association between a data type and a type of biometric information for consent.

9. The data management system according to claim 6,
wherein the first computer is configured to hold a characteristics check sheet for acquiring information indicating characteristics of the user of the first computer, and
wherein, in the data registration processing, the first computer is configured to:
receive check-marking on the characteristics check sheet; and
determine the type of the biometric information for consent based on characteristics of the user of the first computer that are indicated by the check-marked characteristics check sheet.

10. The data management system according to claim 9, wherein the characteristics check sheet includes check items for identifying a personality of the user of the first computer which is used to determine types of the biometric information for consent that are prohibited to be acquired from the user of the first computer, and/or the number of types of the biometric information for consent and the types of the biometric information for consent.

11. The data management system according to claim 6,
wherein the first computer is coupled to an input apparatus and a display apparatus,
wherein, in the data registration processing, the first computer is configured to determine, based on input to the input apparatus, whether to display a guidance screen including display of the determined type of biometric information for consent on the display apparatus when the data presentation processing is executed, and
wherein, when it is determined that the guidance screen is to be displayed, the first computer is configured to display the guidance screen on the display apparatus in the data presentation processing before the determined type of biometric information for consent is acquired.

12. The data management system according to claim 6, wherein, when the type of biometric information for encryption determined in the data registration processing and the type of biometric information for consent determined in the data registration processing are common with each other, the first computer is configured to simultaneously acquire, in the data presentation processing, biometric information of the common type as biometric information for encryption and biometric information for consent, in a single execution of acquisition processing.

13. A data management method by a data management system comprising a first computer, a second computer and a third computer,
the data management method comprising, in data registration processing:
holding, by the first computer, data;
determining, by the first computer, a type of biometric information for encryption with which the data is to be encrypted;

acquiring, by the first computer, the determined type of biometric information for encryption from a user of the first computer;

generating, by the first computer, from each piece of the acquired biometric information for encryption, a public key based on a predetermined algorithm;

encrypting, by the first computer, the data with use of the public key;

transmitting, by the first computer, the public key to the second computer; and transmitting, by the first computer, the encrypted data to the third computer, the data management method comprising, in data presentation processing:

acquiring, by the first computer, the encrypted data from the third computer;

acquiring, by the first computer, the determined type of biometric information for decryption from the user of the first computer;

generating, by the first computer, from each piece of the acquired biometric information for decryption, a private key based on the predetermined algorithm;

decrypting, by the first computer, the encrypted data with use of the private key; and presenting, by the first computer, each piece of the decrypted registered data, wherein a characteristics check sheet is held by the first computer for acquiring information indicating characteristics of the user of the first computer, and wherein the data registration processing comprises receiving, by the first computer, check-marking on the characteristics check sheet, and determining, by the first computer, the type of the biometric information for encryption based on characteristics of the user of the first computer that are indicated by the check-marked characteristics check sheet.

14. A non-transitory computer-readable medium storing a program causing a data management system comprising a first computer, a second computer and a third computer to execute data management, the first computer being configured to hold data in data registration processing, the program causing the first computer to, in the data registration processing:

determine a type of biometric information for encryption with which the data is to be encrypted;

acquire the determined type of biometric information for encryption from a user of the first computer;

generate from each piece of the acquired biometric information for encryption, a public key based on a predetermined algorithm;

encrypt the data with use of the public key;

transmit the public key to the second computer; and transmit the encrypted data to the third computer, the program causing the first computer to, in data presentation processing:

acquire the encrypted data from the third computer;

acquire the determined type of biometric information for decryption from the user of the first computer;

generate from each piece of the acquired biometric information for decryption, a private key based on the predetermined algorithm;

decrypt the encrypted data with use of the private key; and present each piece of the decrypted registered data, wherein the first computer is configured to hold a characteristics check sheet for acquiring information indicating characteristics of the user of the first computer, and wherein, in the data registration processing, the first computer is configured to receive check-marking on the characteristics check sheet, and determine the type of the biometric information for encryption based on characteristics of the user of the first computer that are indicated by the check-marked characteristics check sheet.

* * * * *